(12) United States Patent
Margolus et al.

(10) Patent No.: US 7,979,771 B2
(45) Date of Patent: Jul. 12, 2011

(54) ERASURE CODING TECHNIQUE FOR SCALABLE AND FAULT TOLERANT STORAGE SYSTEM

(75) Inventors: Norman H. Margolus, Cambridge, MA (US); Thomas Jaskiewicz, Mason, NH (US)

(73) Assignee: Permabit Technology Corporation, Cambridge, MA (US)

( * ) Notice: Subject to any disclaimer, the term of this patent is extended or adjusted under 35 U.S.C. 154(b) by 1032 days.

(21) Appl. No.: 11/696,654

(22) Filed: Apr. 4, 2007

(65) Prior Publication Data

US 2007/0245083 A1 Oct. 18, 2007

Related U.S. Application Data

(60) Provisional application No. 60/789,016, filed on Apr. 4, 2006.

(51) Int. Cl.
*G06F 11/10* (2006.01)
*H03M 13/05* (2006.01)

(52) U.S. Cl. .................. 714/752; 714/770; 714/776

(58) Field of Classification Search .............. 714/752, 714/770, 776
See application file for complete search history.

(56) References Cited

U.S. PATENT DOCUMENTS

| | | | |
|---|---|---|---|
| 4,438,522 A | 3/1984 | Bluethgen | |
| 5,485,474 A | 1/1996 | Rabin | |
| 5,499,253 A | 3/1996 | Lary | |
| 5,617,541 A * | 4/1997 | Albanese et al. | 709/207 |
| 5,754,756 A | 5/1998 | Watanabe et al. | |
| 6,079,042 A * | 6/2000 | Vaman et al. | 714/755 |
| 6,320,520 B1 * | 11/2001 | Luby | 341/50 |
| 6,553,420 B1 | 4/2003 | Karger et al. | |
| 7,062,648 B2 * | 6/2006 | Moulton et al. | 713/153 |
| 7,103,824 B2 * | 9/2006 | Halford | 714/759 |
| 7,219,289 B2 * | 5/2007 | Dickson | 714/752 |
| 7,233,264 B2 * | 6/2007 | Luby | 341/50 |
| 7,240,236 B2 * | 7/2007 | Cutts et al. | 714/6 |
| 7,304,990 B2 * | 12/2007 | Rajwan | 370/389 |
| 7,363,346 B2 * | 4/2008 | Groner et al. | 709/214 |
| 7,472,334 B1 * | 12/2008 | Scott et al. | 714/785 |
| 7,577,866 B1 * | 8/2009 | Fan et al. | 714/6 |
| 2004/0167898 A1 | 8/2004 | Margolus et al. | |
| 2005/0063217 A1 | 3/2005 | Shiraishi et al. | |
| 2006/0116990 A1 | 6/2006 | Margolus et al. | |

OTHER PUBLICATIONS

G. Feng et al., "New Efficient MDS Array Codes for RAID, Part I: Reed-Solomon-Like Codes for Tolerating, Three Disk Failures," IEEE Trans. On Computers, vol. 54, No. 9, Sep. 2005.

(Continued)

*Primary Examiner* — Stephen M Baker
(74) *Attorney, Agent, or Firm* — Fish & Richardson P.C.

(57) ABSTRACT

A method for encoding a block of data to allow it to be stored or transmitted correctly in the face of accidental or deliberate modifications, the method including constructing a number n greater than one of original components, each of which is derived from the block and each of which is smaller than the block, and combining original components to construct a number m greater than one of new components, wherein each of the new components is smaller than the sum of the sizes of the original components combined to produce it, wherein the block can be reconstructed from any set of n different components selected from the original components and new components, and wherein a set of n different components selected from the original components and new components contains more redundant information about the block than the set of n original components.

17 Claims, 17 Drawing Sheets

OTHER PUBLICATIONS

G. Feng et al., "New Efficient MDS Array Codes for RAID, Part II: Rabin-Like Codes for Tolerating Multiple (≧4) Disk Failures," IEEE Trans. On Computers, vol. 54, No. 12, Dec. 2005.

Honicky et al., "Replication Under Scalable Hashing: A Family of Algorithms for Scalable Decentralized Data Distribution," Procs. Of the 18$^{th}$ Int. Parallel and Distributed Processing Symposium (IPDPS), Santa Fe, NM, Apr. 2004.

Karger et al, Consistent Hashing and Random Trees: Distributed Caching Protocols for Relieving Hot Spots on the World Wide Web, Procs. Of the 29$^{th}$ Ann. ACM Symposium on Theory of Computing, El Paso, TX, May 1997.

Patterson et al., "A Case for Redundant Arrays of Inexpensive Disks (RAID)," Procs. Of the 1988 ACM SIGMOD Int. Conf. on Management of Data, Sep. 1988.

Stoica et al., "Chord: A Scalable Peer-to-peer Lookup Service for Internet Applications," Procs. Of the ACM SIGCOMM'01, San Diego, CA, Sep. 2001.

Thomasian, "Multi-Level RAID for Very Large Disk Arrays," ACM SIGMETRICS Performance Evaluation Review, Mar. 2006.

\* cited by examiner

Storage System #2

$R=2, \ A_{tot}= 660GB$

FIG. 10

| | 0000 | 0001 | 0010 | 0011 | 0100 | 0101 | 0110 | 0111 | 1000 | 1001 | 1010 | 1011 | 1100 | 1101 | 1110 | 1111 | |
|---|---|---|---|---|---|---|---|---|---|---|---|---|---|---|---|---|---|
| | 1 | 1 | 1 | 1 | 1 | 1 | 1 | 1 | 1 | 1 | 1 | 1 | 1 | 1 | 1 | 1 | R |
| | 2 | 2 | 2 | 2 | 2 | 2 | 2 | 2 | 2 | 2 | 3 | 3 | 3 | 3 | 3 | 3 | |
| | 3 | 3 | 3 | 3 | 4 | 4 | 4 | 4 | 4 | 4 | 4 | 4 | 4 | 4 | 4 | 4 | |

W

| Ideal | Actual | Actual/Ideal |
|---|---|---|
| $e_1 = 16$ | $e^*_1 = 16$ | 1.00 |
| $e_2 = 10^{2/3}$ | $e^*_2 = 10$ | .94 |
| $e_3 = 10^{2/3}$ | $e^*_3 = 11$ | 1.03 |
| $e_4 = 10^{2/3}$ | $e^*_4 = 11$ | 1.03 |
| $A_{tot} = 450$ GB | $A^*_{tot} = 436.4$ GB | 0.97 |
| $A_1 = 150$ GB | $A^*_1 = 145.5$ GB | 0.97 |
| $A_2 = 100$ GB | $A^*_2 = 90.9$ GB | 0.91 |
| $A_3 = 100$ GB | $A^*_3 = 100$ GB | 1.00 |
| $A_4 = 100$ GB | $A^*_4 = 100$ GB | 1.00 |
| $P_{12} = 7.11$ | $P^*_{12} = 10$ | 1.41 |
| $P_{13} = 7.11$ | $P^*_{13} = 11$ | 1.55 |
| $P_{14} = 7.11$ | $P^*_{14} = 11$ | 1.55 |
| $P_{23} = 4.7$ | $P^*_{23} = 5$ | 1.06 |
| $P_{24} = 4.7$ | $P^*_{24} = 5$ | 1.06 |
| $P_{34} = 4.7$ | $P^*_{34} = 6$ | 1.28 |

```
initialize OldTable and NewTable;
widen NewTable if necessary;
tabulate statistics;

let S = {list of stores in NewTable or being added};

beginloop UPDATE_TABLE                \* Named loop with exit in middle *\ let Target =      most over-represented store in S
                      (in case of tie: use latest in list);
    let S_r = S without Target beginloop UPDATE_COLUMN           \* Named loop with exit in middle *\
        repeat
            if (size{S_r}=0) then exit UPDATE_TABLE;
            let Replacement = select one store from S_r;
            remove Replacement from S_r;
        until (replacing Target with Replacement would reduce
                the maximum over-representation in NewTable)

let Columns =    {list of columns in NewTable that contain Target,
                          and where the non-Target stores can be paired
                          with Replacement};

if (size{Columns}>0) then
            let TheColumn = select one column from Columns;
            replace Target with Replacement in TheColumn of NewTable;
            update statistics;
            exit UPDATE_COLUMN;
        endif
    endloop UPDATE_COLUMN             \* Exit UPDATE_COLUMN continues here *\
endloop UPDATE_TABLE                  \* Exit UPDATE_TABLE  continues here *\
```

FIG. 11

$$X_k = \sum_{j=0}^{N-1} 2^{a_{k,j}} B_j$$

Some matrices of exponents $a_{k,j}$ for $N+M$:

2+2: $\begin{bmatrix} 0 & 0 \\ 0 & 1 \end{bmatrix}$

3+3: $\begin{bmatrix} 0 & 0 & 1 \\ 0 & 1 & 0 \\ 1 & 0 & 0 \end{bmatrix}$

4+2: $\begin{bmatrix} 0 & 0 & 0 & 0 \\ 0 & 1 & 2 & 3 \end{bmatrix}$

6+3: $\begin{bmatrix} 0 & 0 & 0 & 0 & 0 & 0 \\ 0 & 1 & 2 & 3 & 4 & 5 \\ 5 & 4 & 3 & 2 & 1 & 0 \end{bmatrix}$ 3+6: $\begin{bmatrix} 0 & 0 & 5 \\ 0 & 1 & 4 \\ 0 & 2 & 3 \\ 0 & 3 & 2 \\ 0 & 4 & 1 \\ 0 & 5 & 0 \end{bmatrix}$

Want to recover $B_1$, $B_2$ and $B_3$ from $X_1$, $X_2$ and $X_3$

<u>Normal Arithmetic:</u>

$X_2 - 4X_1 = -3B_1 - 2B_2$
$X_2 - 4X_3 = -15B_1 - 6B_2$
$3(X_2 - 4X_1) - (X_2 - 4X_3) = 6B_1$

<u>Using Bitwise XOR as Addition:</u>

ERASURE CODING TECHNIQUE FOR SCALABLE AND FAULT TOLERANT STORAGE SYSTEM

CROSS-REFERENCE TO RELATED APPLICATION

This application claims priority to U.S. Provisional Application Ser. No. 60/789,016, filed on Apr. 4, 2006.

TECHNICAL FIELD

The invention relates to storage systems for computers, and particularly to fault tolerant systems containing a multiplicity of storage devices.

BACKGROUND

As the number of hard disks in large-scale storage systems has increased, techniques that employ redundancy in order to tolerate hardware faults without loss of data, and even without interruption of access to data, have become increasingly important. The most popular technique of this sort is called RAID5, a term introduced by David A. Patterson, Garth A. Gibson and Randy H. Katz in the paper, "A case for redundant arrays of inexpensive disks RAID," published in the Proceedings of the 1988 ACM SIGMOD International Conference on Management of Data, September 1988. RAID5 systems can provide both I/O performance improvements, by spreading the pieces of a data object across multiple disks, and data safety improvements, by storing redundant information that is sufficient to allow the data on a single failed disk to be reconstructed. Arrays of disks are coupled to form RAID5 groups and a simple parity code (where the data stored in a region of one disk is the bitwise XOR of data stored in corresponding regions of other disks in the group) is typically employed to provide redundancy with minimal storage space overhead. Other methods for coupling disks together to allow recovery after a single disk failure were also surveyed in the 1988 paper, including replication of each data block on two different disks (called RAID1 there). Advances on RAID5 that allow recovery after two simultaneous disk failures have come to be known as RAID6.

One could imagine increasing the capacity of RAID-based storage systems by simply adding subsystems, each protected by its own internal RAID redundancy. In this case the overall system becomes less reliable as additional fallible subsystems are included in it. A more scalable alternative is to provide redundancy across subsystems that are well insulated from each other's failures, so that failure of entire subsystems can be tolerated. This kind of redundancy can be provided by RAID running across subsystems, as is described for example in "Multi-Level RAID for Very Large Disk Arrays," by Alexander Thomasian, published in ACM SIGMETRICS Performance Evaluation Review, March 2006. This approach has the disadvantage that the rigid correspondence of data components between elements of the RAID group makes incremental scaling difficult. One could not, for example, increase total storage capacity by just increasing the capacity of one subsystem.

Alternative schemes have been proposed for spreading redundancy across subsystems, with storage responsibilities shifting incrementally as individual subsystems are added or removed. The management of storage assignments must also, of course, be fault tolerant. The Chord system introduced randomized algorithms for achieving these goals in the peer-to-peer world. Chord was described by Ion Stoica, Robert Morris, David Karger, M. Frans Kaashock, and Hari Balakrishnan in the paper, "Chord: A Scalable Peer-to-peer Lookup Service for Internet Applications," published in the Proceedings of ACM SIGCOMM'01, San Diego, September 2001. It built upon work by D. Karger, E. Lehman, F. Leighton, M. Levine, D. Lewin, and R. Panigrahy, "Consistent hashing and random trees: Distributed caching protocols for relieving hot sports on the World Wide Web," which was published in the Proceedings of the 29the Annual ACM Symposium on Theory of Computing (El Paso, Tex., May 1997). The consistent hashing work was also the subject of the patent U.S. Pat. No. 6,553,420, Karger et al., "Method and Apparatus for Distributing Requests Among a Plurality of Resources," filed June 1998.

Chord is a randomized mechanism that assigns data to storage servers. The Chord algorithm uses hash-based block names as permanent identifiers for blocks of data and divides the address space of all possible block names among the storage servers. The division is accomplished by pseudo-randomly assigning a number of points in the address space to each storage server. The collection of all assigned points are used to define a set of address ranges: each server is responsible for all blocks with names that fall into an address range for which it has been assigned the starting point. The address range extends to the next point assigned to a server. When a new server is added to the storage system, new points are pseudo-randomly assigned to it and responsibility for portions of the address space correspondingly shift; data is shifted between servers accordingly. The number of points assigned to a server is proportional to its storage capacity. The same set of address ranges is used to define responsibilities for both primary and redundant copies of a block: the primary copy falls in some address range, and redundant copies belong to the servers assigned succeeding ranges. When a server dies or is removed from the system its assigned points disappear. This causes some adjacent address ranges to be extended and storage responsibilities to shift. The Chord approach of randomly assigning storage responsibilities works well for very large numbers of servers, but it does not scale well to smaller numbers of servers. For example, the only guarantee that Chord makes that redundant copies of data are assigned to different servers is statistical—this guarantee fails for small numbers of servers. If all copies of a block of data are stored on the same server, then the data is lost if that server fails.

A randomized storage assignment method that doesn't suffer from this problem is described by R. Honicky and Ethan Miller in their paper, "Replication Under Scalable Hashing: A Family of Algorithms for Scalable Decentralized Data Distribution," which appeared in the Proceedings of the 18th International Parallel & Distributed Processing Symposium (April, 2004). They provide algorithms for assigning replicas of blocks of data (or other redundant components derived from the blocks) to a set of storage devices, with each replica being placed on a different storage device. The RUSH algorithms involve grouping together storage devices that were added to the storage system at the same time and labelling each group with a unique cluster identifier. A deterministic function of block identifiers and cluster identifiers determines where each replica resides. As new clusters are added, the algorithm reassigns some fraction of all replicas to the new storage.

RUSH doesn't allow individual failed storage devices to be removed, only entire clusters of devices, and there are constraints on the minimum size of a cluster. These algorithms also have the drawback that the amount of work needed to determine where a replica resides increases as the number of clusters increases. All identifiers for blocks already stored need to be checked using the RUSH algorithm when new storage is added in order to determine which blocks have been reassigned to the new storage and need to be moved.

Redundancy schemes similar to those used in RAID5 systems have also been employed in storage systems that use randomized placement of redundant components. This class of redundancy schemes is sometimes referred to as "erasure resilient codes," because they depend on knowing which redundant components have been "erased" in order to reconstruct the missing data. The use of parity blocks, as in RAID5, is an efficient way to protect against a single disk failure: corresponding bits on each disk are treated as bits of a codeword, protected by a single parity bit, allowing any single-bit erasure (i.e., any single disk failure) to be recovered. This approach can be extended to schemes that can recover from multiple hardware failures by protecting a longer codeword with a more sophisticated error correcting code. This is the basis of advances on the RAID5 technique, as is discussed for example by G. Feng et al. in "New Efficient MDS Array Codes for RAID, Part I: Reed-Solomon-Like Codes for Tolerating Three Disk Failures," published in IEEE transactions on Computers, September 2005. The same distributed-codeword idea is also the basis of fault tolerant distributed storage methods, such as the one described by Michael Rabin in U.S. Pat. No. 05,485,474, "Scheme for Information Dispersal and Reconstruction," filed in May 1991. This generic dependence of distributed-storage protection schemes on the idea of a distributed codeword has a drawback: error correcting codes are designed to protect collections of elements each of which is only a few bits long. There may be better codes available if advantage can be taken of the fact that the elementary units of storage being protected are actually hundreds or thousand of bytes long (or longer).

In summary, there is a need to protect storage systems comprising large collections of disks from faults in an incrementally scalable fashion. It is desirable that the method be able to scale down to relatively small collections of disks, since storage systems that grow large may not start off large. The ability to add and remove storage in small increments is useful not only for scaling, but also for non-disruptive migration to new hardware. Data assignment schemes based on randomized placement of data are attractive, but exiting algorithms have distinct disadvantages in terms of incremental salability and efficiency. Finally, existing storage schemes base their fault recovery on error correcting codes that are designed to protect very small data elements, and take no advantage of the relatively large size of the elementary units of storage being protected.

SUMMARY

In a first aspect, the invention features a method for encoding a block of data to allow it to be stored or transmitted correctly in the face of accidental or deliberate modifications, the method comprising constructing a number n greater than one of original components, each of which is derived from the block and each of which is smaller than the block, and combining original components to construct a number m greater than one of new components, wherein each of the new components is smaller than the sum of the sizes of the original components combined to produce it, wherein the block can be reconstructed from any set of n different components selected from the original components and new components, and wherein a set of n different components selected from the original components and new components contains more redundant information about the block than the set of n original components.

Preferred implementations of this aspect of the invention may incorporate one or more of the following.

The combining may further comprise scaling original components to determine scaled original components, and accumulating sealed original components to determine a one of the m new components, wherein scaling comprises determining from a one of the original components a one of the scaled original components in a manner that allows the one of the original components to be determined from the one of the scaled original components, and wherein accumulating comprises combining portions of the one of the original components with corresponding portions of another component derived from original components.

The scaling step may comprise performing a non-cyclic shift operation.

The non-cyclic shift operation may be implemented as a memory addressing operation.

The shift-amount of the non-cyclic shift operation may be determined, at leas in part, by a multiplication modulo a prime number.

The scaling step may comprise multiplying an integer that comprises a binary representation of the one of the original components by a scaling factor.

Combining portions with corresponding portions in the accumulating step may comprise performing addition operations or bitwise XOR operations with a first operand taken from the portions and a second operand taken from the corresponding portions.

At least one of the m new components may be larger than at least one of the n original components.

The sum of the sizes of each of the original components plus the sum of the sizes of each of the new components may be less than one percent greater than $(1+m/n)$ times the size of the block.

A number m of new components may be constructed from a fixed set of n original components, where m may not be chosen until the construction of new components ends and there may be no upper bound on the size of m.

Each of the original components and new components may be preferentially stored on a storage subsystem that is different than that on which any other of the original components and new components is stored.

The storage subsystem may comprise at least one disk drive.

The combining step may further comprise determining an integer from a one of the original components in a manner which allows the one of the original components to be determined from the integer, scaling the integer to produce a sealed integer, wherein scaling comprises applying a multiplication-like operation to two operands, with a first of the two operands being the integer and a second of the two operands being a scaling factor, accumulating scaled integers to determine a one of the m new components, wherein the accumulating comprises applying a dyadic operation to combine the scaled integer with another integer derived from original components, and wherein the multiplication-like operation is the same as integer multiplication whenever one of its two operands is positive and a power of two.

The dyadic operation may be addition.

The dyadic operation may be bitwise XOR.

The scaling factor may be a power of two with the exponent determined by a multiplication modulo a prime number.

The other component derived from original components may be a scaled original component.

Other features and advantages of the invention will be found in the detailed description, drawings, and claims.

DESCRIPTION OF DRAWINGS

FIG. 10 illustrates a sample routing table (and related statistics) for storage system #3 of FIG. 5, with T=10%.

FIG. 11 provides a pseudocode description of the routing table generation algorithm.

FIG. 15 provides five examples of N+M erasure codes with power of two coefficients: matrices of exponents are shown and the summation sign indicates either addition or XOR.

FIG. 16 illustrates erasure coding and decoding using normal arithmetic and compares this with using bitwise XOR as the addition operation.

DETAILED DESCRIPTION

There are a great many possible implementations of the invention, too many to describe herein. Some possible implementations are described below. It cannot be emphasized too strongly, however, that these are descriptions of implementations of the invention, and not descriptions of the invention, which is not limited to the detailed implementations described in this section but is described in broader terms in the claims.

In a distributed storage system which is scalable in capacity, some basic problems are
  (1) keeping track of where objects have been stored
  (2) balancing storage work among storage servers
  (3) tolerating device failures
  (4) recovering from device failures
  (5) balancing recovery work among storage servers
  (6) allowing storage devices to be added and removed The Chord scheme, discussed above, deals well with some of these issues. For example, the indexing of data objects is fully distributed and the work needed to access an object is independent of the history of storage additions and removals. Chord does not, however, work well for small systems and does not take advantage of the fact that some subsets of servers are more richly interconnected than others. For example, sets of servers connected to the same network switch can communicate with each other more efficiently than with servers on different switches, and much more efficiently than with servers that aren't on the same local area network.

Constructing a storage system out of clusters of richly interconnected servers does not limit the salability of the overall system, since fault tolerance can be provided in a hierarchical manner. Unit clusters, called "cliques," may scale over a large range in number of servers, but not indefinitely. The same techniques used to spread data across the storage devices within a clique can be reused to spread data across cliques or across additional levels of a storage hierarchy.

Figure 1:
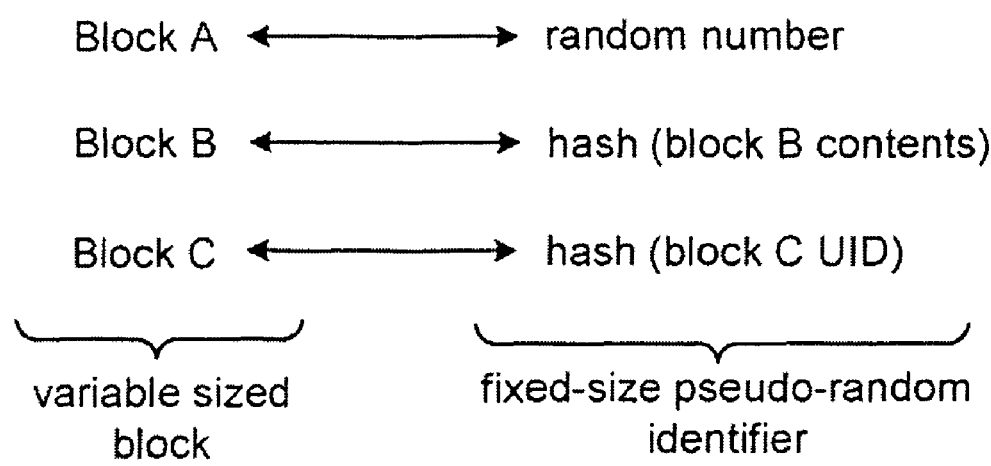
FIG. 1 gives examples from prior art of identifiers, randomly distributed within a fixed address space, suitable for use with random-address based data distribution.

In one implementation, all blocks are named with a fixed size pseudo-randomly generated unique identifier. We assume that if the identifiers are sufficiently long, the chance that the pseudo-random processes generating the identifiers ever produces the same identifier for two different blocks can be ignored. Some examples of suitable identifiers are given in FIG. 1. A randomly generated number is a suitable identifier. A cryptographic has of a block's contents is suitable, and has the property that it can be used to simplify sharing of storage if the same block is stored more than once. A cryptographic hash of any other unique identifier which has already been assigned to the block is also suitable. The identifier used in the disclosed implementation could also be a fixed size segment of any other identifier, if the segment is sufficiently random and sufficiently long.

Figure 2:
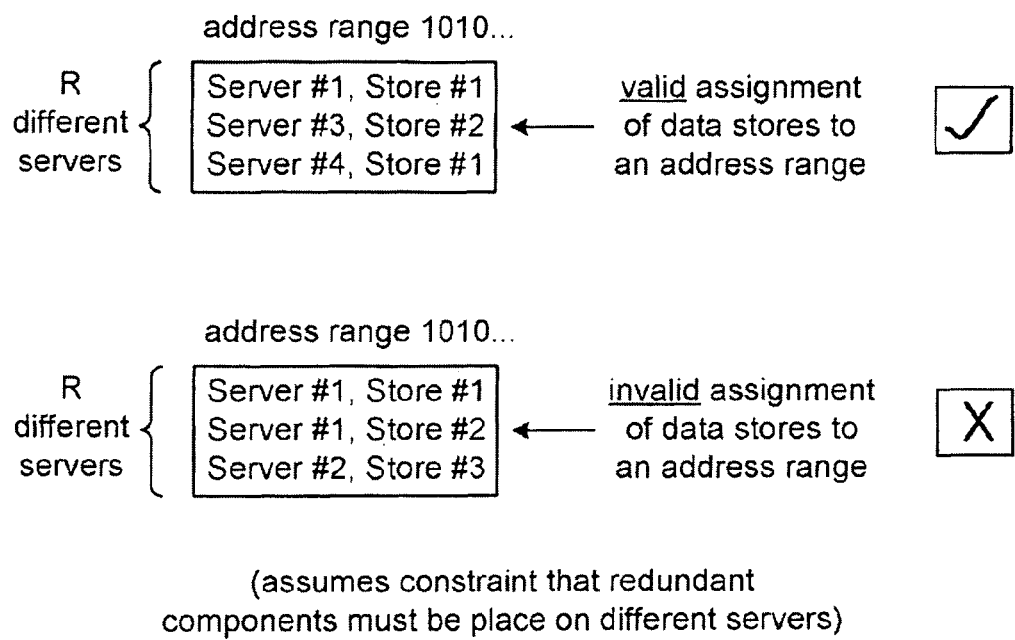
FIG. 2 illustrates a valid and an invalid assignment of data stores to an address range, given the constraint that redundant components must be placed on different servers.
Figure 3:
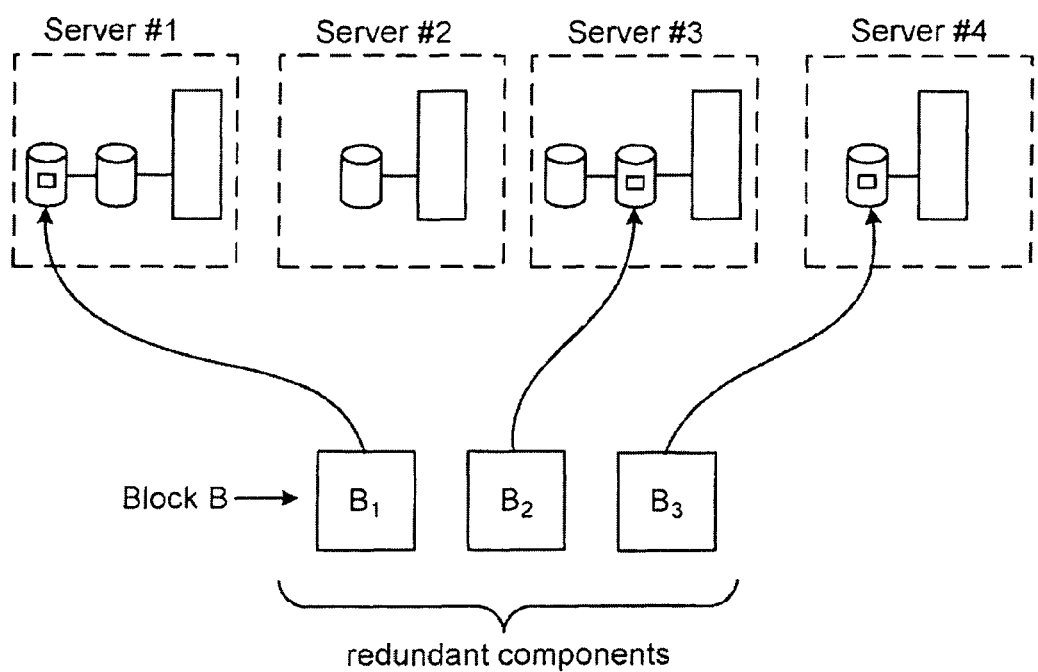
FIG. 3 illustrates a block B encoded as three redundant-components that are stored on different stores of different servers.
Figure 4:
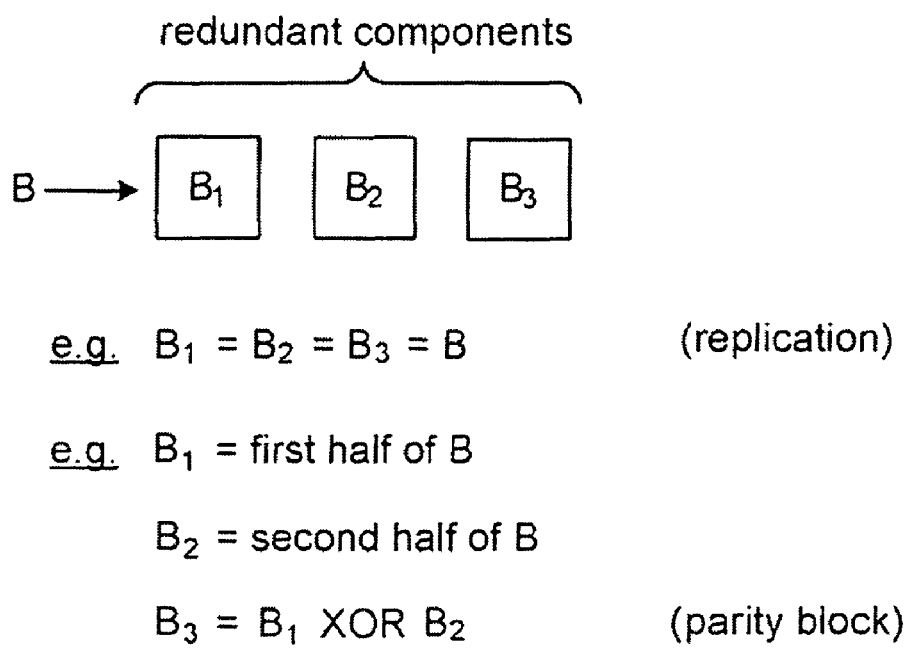
FIG. 4 provides two examples from prior art of encodings of a block B into three redundant components.

All servers within a clique are provided with a copy of a common address-range-assignment table which is recomputed whenever a storage device is added or removed from service. This table assigns storage to all redundant components that represent a block of stored data, arranging the locations of components to provide the greatest possible protection from hardware failures. This is illustrated in FIG. 2 and FIG. 3. In FIG. 2, we see that redundant data for blocks with identifiers that start with "1010" in binary are assigned to three different data stores on three different storage servers. Thus if any single store fails, or any single server fails, only one of the redundant components for the block is lost. FIG. 3 shows a particular block B with an identifier that starts with "1010". The block is encoded into three redundant components, at least one of which can be lost and reconstructed from the other two. The three redundant components are stored on three different servers, as indicated in the routing table information from FIG. 2. Two examples of suitable redundant encodings are given in FIG. 4. The first example simply makes three copies of each block. In this case only one third of the available storage space can be used for distinct data. The second example adds an extra parity block the size of half of each data block. In this case, two thirds of the available storage space can be used for distinct data. Encodings with lower overhead and greater tolerance for data loss are discussed in the section, "Encoding and Use of Redundant Components."

The address-range-based approach taken here avoids the need for any centralized index of where individual data objects have been stored, while allowing optimization of storage and recovery properties whenever the table is regenerated. We focus here largely on this optimization problem. (We use the term optimization to refer broadly to the process of choosing implementations with improved performance; we do not intend to limit ourselves to implementations that are truly optimal, i.e., that have the very best performance.) The related problem of accessing and indexing pseudo-randomly named data within each storage server is discussed in U.S. patent application Ser. No. 2006/0116990, "A Storage System for Randomly Named Blocks of Data," by Margolus et al (Sep. 30, 2005), which is incorporated here by reference. Some simple and efficient schemes for encoding and reconstructing redundant components are also presented here.

Optimization Problem

A clique consists of a number D of data stores divided up among a number S of storage servers. Each data store is assigned responsibility for a number of address ranges. The table which records the address range responsibilities of the various data stores is called the routing table. The routing table divides the total address space into a set of equal sized address ranges and specifies the set of data stores assigned responsibility for each range.

In order to achieve failure tolerance, each data object is represented within the storage system by R redundant components. These redundant components may be complete replicas of the data object, or they may be the elements of some other erasure-resilient encoding scheme.

The routing table structure and generation algorithm reconciles four principal constraints;

1) FULL CAPACITY: Storage responsibilities should ideally be assigned to data stores in a manner that maximizes total storage capacity. A preassigned tolerance T specifies the maximum fraction of the storage capacity that may be wasted when the clique is full.

2) FAULT TOLERANCE: Redundant components of a single data object should ideally be assigned to different data stores and different servers in order to tolerate as many simultaneous hardware failures as possible.

3) FAST RECOVERY: Redundant components should ideally be arranged so that all data stores can participate in parallel to speed recovery after a hardware fault. As little data as possible should ideally be moved when storage is removed, in order to speed recovery.

4) INCREMENTAL GROWTH: It should ideally be possible to add and remove storage in small increments. As little data as possible should ideally move in order to allow the new storage to assume its fair share of the storage workload.

Full Capacity

The FULL CAPACITY constraint sets a limit on wasted space. Since blocks are assigned to data stores pseudo-randomly, there is a statistical component to the wasted space. Since the sizes of address ranges are quantized when they appear in the routing table, there is a also a systematic component: if one data store is made responsible for more than its fair share of data, then it will fill up while there is still space left elsewhere in the system. Once one data store is full the system is considered full and any space left elsewhere will be wasted. The maximum fraction of the available storage capacity that can be wasted is given by the tolerance T.

We first focus on the statistical component of wasted space. Let us, for the moment, ignore any quantization of address ranges and image that each data store has been assigned a fraction of the total address space that is exactly proportional to its storage capacity. Each data store is responsible for storing all blocks with addresses that fall into address ranges that have been assigned to it. Blocks have a fixed maximum size and are assigned addresses pseudo-randomly, making the allocation of blocks to data stores statistical. Suppose, to make the analysis simple, that all blocks are 8 KB in size and that a given data store comprises a single 500 GB disk drive. Then, when the storage system is nearly full, the given data store will be nearly full, since it is responsible for its fair share of block addresses. On average, the 500 GB data store will be responsible for storing about 6.3 million 8 KB blocks with a standard deviation of about 8000 blocks. Thus the expected statistical fluctuation in storage assignments is no more than a few hundredths of one percent of the data store's capacity. If the tolerance T is much larger than this, then wasted space due to statistical fluctuations can be ignored.

Thus we assume that wasted space will be due to systematic quantization effects in the routing table: storage assignments won't always be exactly proportional to capacity because the address space is divided up evenly into W equal-sized address ranges, where W is the number of columns in the routing table (the width of the table). It is easy to show that with R stores assigned to each address range, as long as the total number of assignments (entries E) in the table is at least as great as the number of data stores divided by the tolerance ($E \geq D/T$), the total available capacity of the clique can be assigned to within a tolerance T of the optimum. This is illustrated in FIG. 10 and the bound is derived in Appendix A. Thus the tolerance constraint sets a minimum width for the routing table: $W=E/R \geq D/RT$. For example, for a clique with 100 data stores, two redundant components representing each block of data and a tolerance of 1% for wasted storage, the width of the routing table must be at least 5000 columns.

Fault Tolerance

The second constraint, FAULT TOLERANCE, is achieved by spreading redundant components of each data object across separately failing hardware. As long a there are more data stores than redundant components, the R components of each data object must be placed on R different stores. This is accomplished by assigning R different stores to each address range. Note, however that in order to meet the FULL CAPACITY constraint, each store must also be assigned a fraction of the total address space proportional to its capacity. If it is not possible to meet both constraints the FAULT TOLERANCE constraint is given precedence and some capacity is left unassigned. For example, if each data object has two redundant components (two replicas), then FAULT TOLERANCE requires that no single store be assigned responsibility for more than half of all data blocks. Thus if one store has a raw capacity that is greater than that of all the other stores in the system combined, it is limited to storing no more than half of the blocks. This kind of capacity limitation only comes into play if the sizes of the stores are dramatically unequal; as more storage is added to the system, previously unassigned capacity becomes usable. We use the term available capacity to refer to the capacity of a storage unit that can actually be assigned, taking the FAULT TOLERANCE constraint into account, in distinction to the raw capacity that could potentially be assigned if this constraint were ignored.

Since entire storage servers may fail as a unit, FAULT TOLERANCE also imposes the constraint that, as long as there are more than R servers, the R components of each object must be placed on R different servers. Note that if this constraint is met, the R components will automatically be placed on different stores. If there are fewer than R servers, then FAULT TOLERANCE requires that the redundant components be spread out as evenly as possible. For example, each data object might be represented as four redundant components using an encoding that allows any two of these components to be recovered from the other two. In this case, as long as no more than two components of each object end up on the same server, any single server failure can be tolerated.

As long as there are at least R servers in the clique, the capacity that is available for storage of redundant components can be computed based on the constraint that no server holds more than one redundant component of any data object. If $C_i$ is the raw capacity of $i^{th}$ server and $A_i$ is that server's available capacity, and servers are numbered from biggest capacity to smallest (in non-increasing order), then for a clique with S servers the available capacities are given by $$A_k = C_k, k \geq R$$

$$A_{R-1} = \min\left(C_{R-1}, \frac{1}{1}\sum_{j=R}^{S} A_j\right)$$

$$A_{R-2} = \min\left(C_{R-2}, \frac{1}{2}\sum_{j=R-1}^{S} A_j\right)$$

M $$A_1 = \min\left(C_1, \frac{1}{R-1}\sum_{j=2}^{S} A_j\right)$$

The total available capacity $A_{tot}$ is the sum of the $A_k$'s. Available capacities of stores are assigned in proportion to their share of the raw capacity of the server: the available capacity of store i which is on server s(i) and has raw capacity $c_i$ is given by $$\alpha_i = A_i(c_i/C_{s(i)})$$

Figure 5:
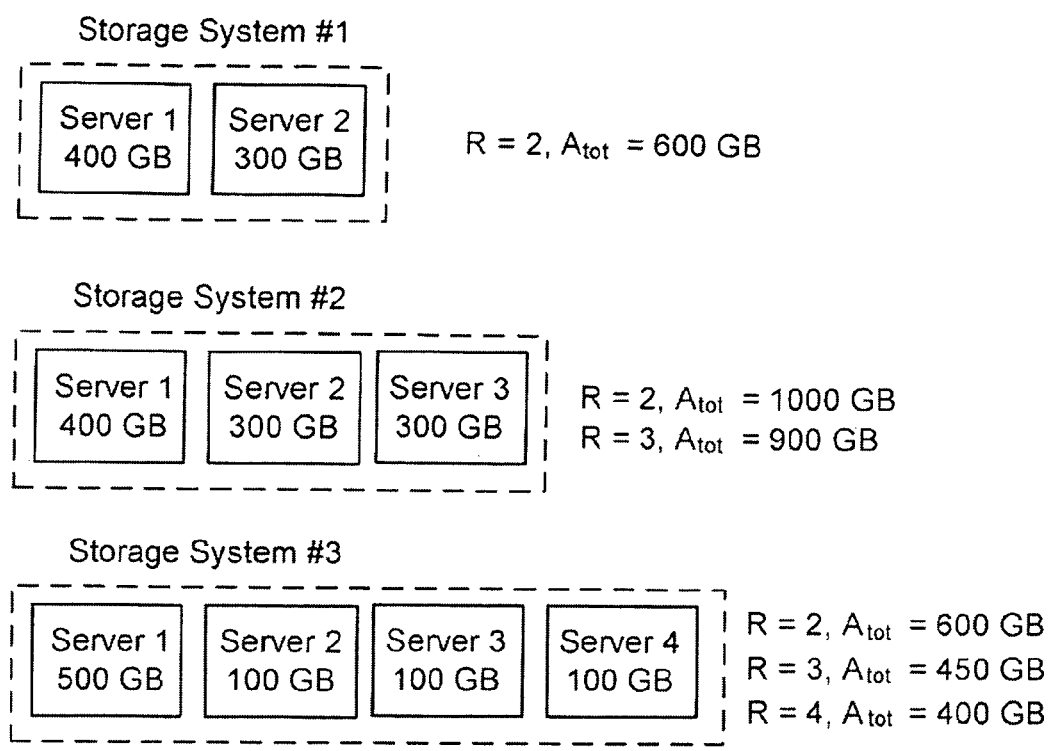
FIG. 5 provides three illustrations of available capacity for storage systems with different numbers of servers, raw capacities, and number of redundant components.

FIG. 5 provides some examples illustrating available capacity for storage systems with different numbers of servers and different numbers of redundant components. In the examples, the raw capacities of each storage server are given. In Storage System #1, server 1 is constrained to hold no more data than server 2, and so the total available capacity is only 600 GB. The 100 GB of server 1 which are not used become available when additional storage is added to the system Storage System #2). If exactly the same servers are used with R=3, 100 GB again becomes unavailable. Storage System #3 illustrates three different available capacities for the same hardware, depending on whether R=2, 3 or 4.

If there are fewer than R servers, then we relax the constraint that only one redundant component of a data object can be placed on each server. If we substitute the constraint that only one redundant component can be placed on each data store, then the available capacity is computed exactly as for the $A_k$'s, but using the $\alpha_k$'s and $c_k$'s for datastores instead of the $A_k$'s and $C_k$'s for storage servers. As was noted earlier, the redundant encoding of data objects may allow more than one redundant component to be lost and still be recovered. For this reason, even when there are fewer than R stores FAULT TOLERANCE may still be enhanced by distributing redundant components as evenly as possible across stores.

Figure 6:
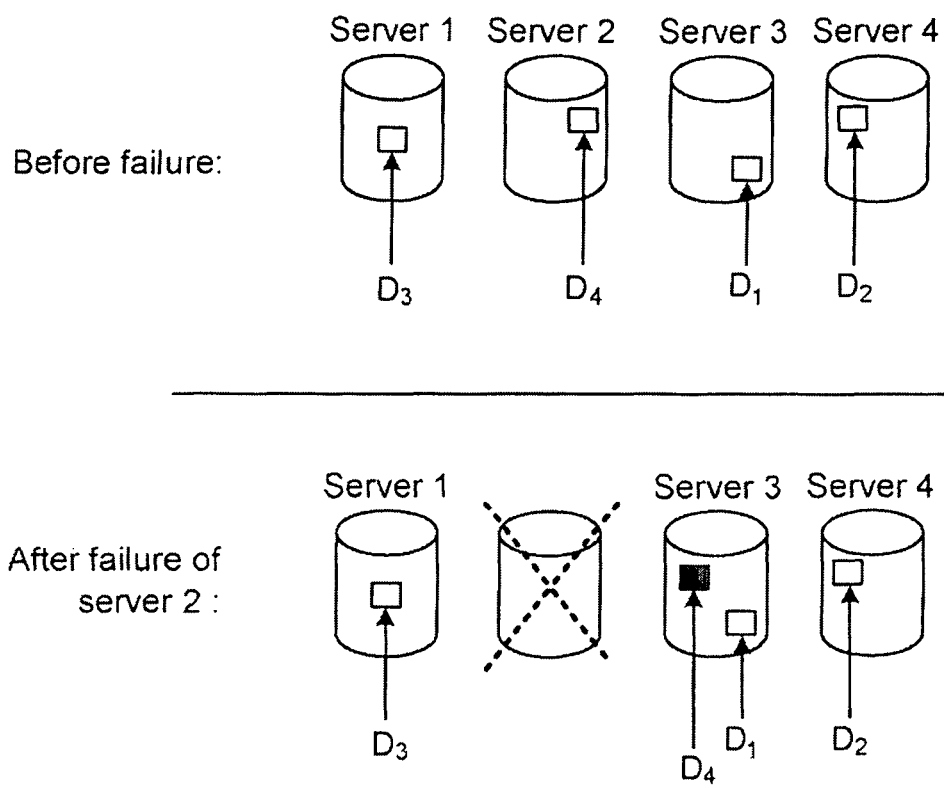
FIG. 6 illustrates a transition to fewer than R servers, with the constraint on number of redundant components per server relaxed after the transition.

This is illustrated in FIG. 6. Here, R=4 and there are four single-store servers, each holding one redundant component of a block D. If server 2 fails, then the four components can no longer be placed on different servers. In this example, $D_4$ is reconstructed on server 3—the other components stay where they are. As long as two missing components of D can be reconstructed from the rest, this configuration continues to provide fault tolerance with minimal data movement.

Fast Recovery

The third constraint is FAST RECOVERY. Ideally the set of data objects that are represented on one store should have their redundant components spread evenly over all other stores, and the new assignment of storage responsibilities after a failure should also be spread evenly over all stores. These two properties together ensure that, after a failure, the work of recovering from the failure is spread evenly over all stores.

Figure 7:
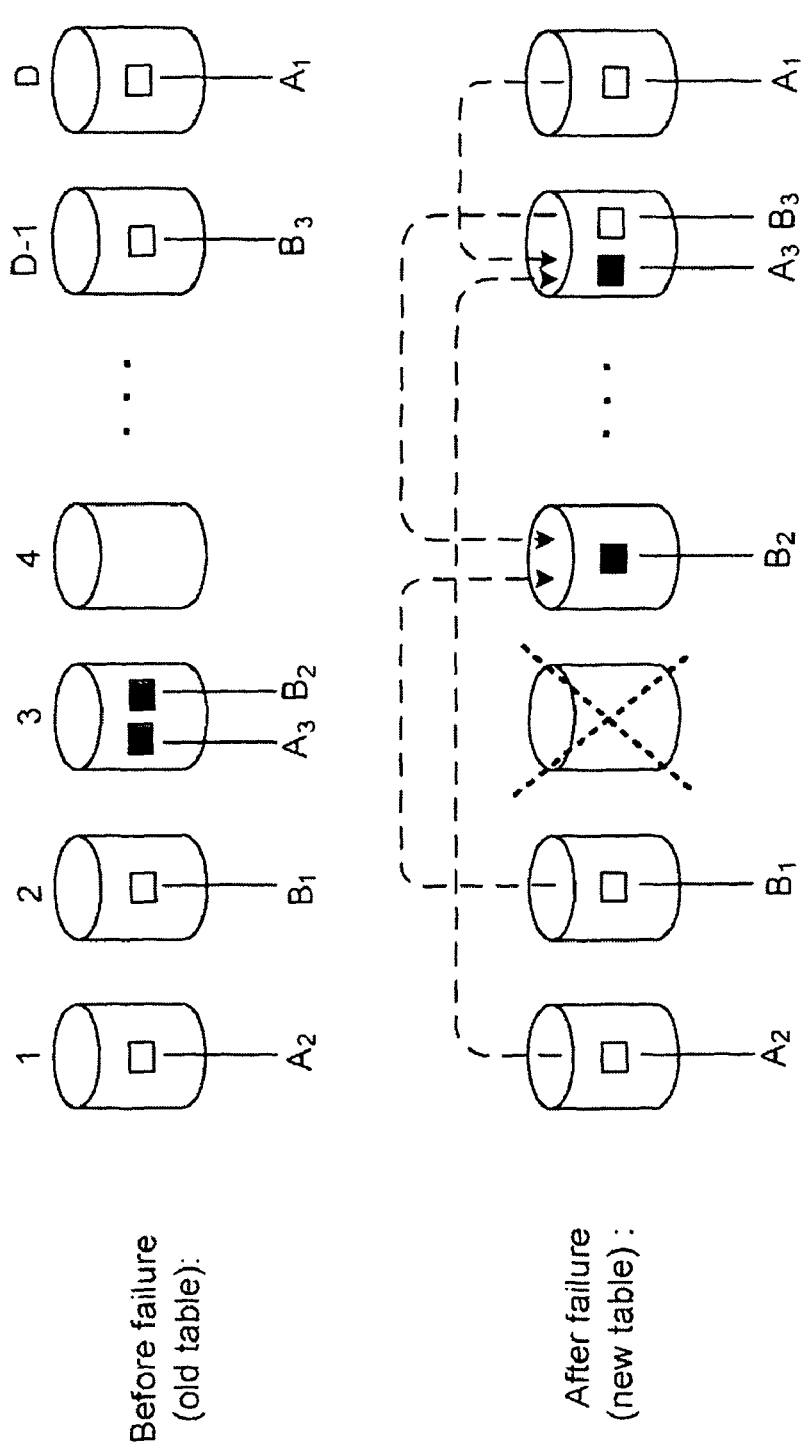
FIG. 7 illustrates part of a recovery process involving the redundant components of two blocks.

The recovery process is illustrated in FIG. 7. Before store 3 fails, redundant blocks are spread over all stores, including store 3. Components for two sample blocks, A and B, are shown (R=3). When store 3 fails, the redundant components that were stored on store 3 must be recreated on other stores. For blocks A and B, these are components $A_3$ and $B_2$. The address ranges containing these components are reassigned to stores D-1 and 4 respectively. One or more of the remaining components of A must be sent to store D-1, to allow $A_3$ to be reconstructed there, and one or more of the remaining components of B must be sent to store 4. The number of components that need to be communicated depend on how the blocks are encoded. If B is simply replicated (all redundant components are complete copies of the block B), then only one component of B needs to be communicated to store 4. If $B_3$ is the XOR of $B_1$ and $B_2$, then both $B_1$ and $B_3$ must be sent to store 4 in order to reconstruct $B_2$.

Notice that in the case of a scheduled removal (rather than a failure), some or all of the components could be sourced from store 3. Using only store 3 would be relatively slow, however. In the illustration, if all redundant components are complete replicas and there are D=100 stores and redundant data is spread evenly over all of them, then each store only needs to source 1% of its data and recreate 1% of the components lost from store 3. If the XOR encoding is used, then they each need to source 2%. This will be far faster than having one store source all of the data.

Of course perfectly even distribution of redundancy generally conflicts with the FULL CAPACITY constraint, which says that the number of address ranges assigned to each store must be proportional to its available capacity. Since we give FULL CAPACITY precedence over FAST RECOVERY, we use a more realistic distribution target: each pair of stores that can appear together should be assigned responsibility for the same address range a number of times that is proportional to the product of their available capacities. Thus, for example, if store x is allowed to be paired with stores y and z (e.g., x is on a different server), then if y is twice as big as store z, y should be paired with x twice as often as z is.

Even with this target it is not generally possible to have a constant proportionality for all pairings while representing available capacities accurately in the table, but we can normally come close. Each store is already represented in the table in proportion to its own available capacity. If its appearance in pairs is also proportional to the available capacity of the total amount of storage it pairs with, this total needs to be the same for all stores, which is only approximately true. Consider, for example, the case where stores are only secluded from pairing with stores on the same server. In this case, if the capacity of servers is unequal, then the total amount of storage that a store on one server can pair with may be different than that seen by a store on another server, but generally not very different. As long as the range of available capacities on different server (i.e., biggest minus smallest) is only a few percent of the total available capacity of the clique, the pairings can also be proportional to within a few percent. The determining parameters are the capacity $A_L$ of the largest group that some store can't pair with, the capacity $A_S$ of the smallest such group, and the total available capacity $A_{tot}$ of the clique. All pairings can then be proportional to the product of available capacities to within a factor of about $(1-(A_L-A_S)/(A_{tot}-A_L))$.

Depending on where the recovery-speed bottleneck is in the hardware and software, ti may be that spreading the data evenly across servers is more important that spreading it evenly across stores. If, however, data is spread in proportion to the product of the available capacities of pairs of stores, then it is also spread in proportion to the product of the available capacities of pairs of servers, and so both goals are achieved as well as is possible.

The FAST RECOVERY constraint also requires that the routing table be constructed and modified in a manner that reduces the number of blocks that need to be moved after a failure in order to recover. When a store x fails, responsibility for the redundant components that were formerly held by x must be reassigned to other stores. Ideally, only the address ranges that were held by x should be reassigned. The representation of the other stores in the table should be increased, since each remaining store now represents a larger fraction of the total capacity. If, however, the replicas of x's data were not spread evenly over other stores, then this ideal may not be possible. As an extreme example, suppose that x was paired in the routing table only with store y. Since y cannot be paired with itself, its representation in the table can only be increased by having it take over address ranges from stores other than x. A similar need for extra address range reassignments can arise if the algorithm creates uneven pairing as it constructs the new table.

The FAST RECOVERY constraint also requires that the new routing table should be made available quickly after a server or a store fails, since recovery cannot begin until the new table is ready. For a single failure, tables for all possible failures can be precomputed and cached. Multiple simultaneous failures are assumed to be rare. Thus fast table generation does not significantly affect the expected frequency of data loss. Reasonably fast table generation does, however, increase convenience and testability. In systems where writes to the clique are inhibited after a store leaves until the new table is in place, at least caching tables for the single failure case is a significant availability issue.

Incremental Growth

Finally, the storage system must support INCREMENTAL GROWTH. This is principally supported by the use of a table-based scheme in which the time it takes to locate the store responsible for a redundant component is independent of the history of storage additions and removals. The use of equal-sized address ranges also makes it easy to rearrange storage assignments when storage is added or removed.

In common with other data-address-based allocation algorithms, when new storage is added some of the old data migrates to the new hardware. This has the advantage that the burden of retrieving this data is also moved to the new hardware. The impact on system performance of storage growth can be minimized by moving as little data as possible in order to achieve the desired storage balance. Again this is an issue of avoiding an assignment that unnecessarily reallocates storage between old stores when adding new stores.

Figure 8:
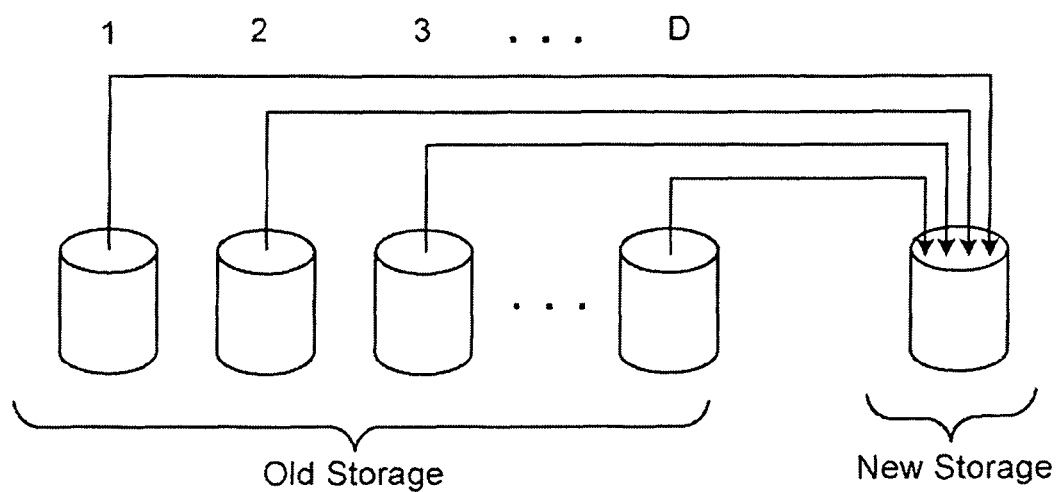
FIG. 8 illustrates the data paths involved in adding a store D+1 to a storage system with D stores.

The process of adding storage is illustrated in FIG. 8. When store D+1 is added to the storage system, a fraction of the address ranges associated with other stores are reassigned to the new store. A corresponding fraction of the redundant components stored on the other stores are communicated to the new store. In this case the components can be simply copied rather than recreated, but the process is much slower than recovery from a failed store, since there is only a single target for all of this communication. If recovery were going on while storage was being added, some of the components on store D+1 would be recreated rather than copied.

Since hard disk drives have an infant mortality period that may last for months, it may be desirable when adding storage capacity to temporarily reduce the available capacity of new stores during some initial infancy period. This correspondingly speeds up the recovery process if a new store fails, since there is less data to recover. This temporary reduction can be accomplished by imposing an infancy period constraint during routing table generation that reduces the available capacity, and regenerating the table without this constraint once the infancy period is over. This would be a case in which adding storage to the clique (after the infancy period) doesn't involve physically attaching new storage devices, but rather just involves revising the raw capacity of existing stores.

Figure 9:
FIG. 9 provides an example where new storage hardware with a high "infant" failure rate is initially added to the system with less than its full storage capacity.

This idea is illustrated in FIG. 9, with reference to FIG. 5. Starting with Storage System #1 of FIG. 5, we add a server 3 with raw capacity of 300 GB. Since this is new hardware, we assign it an available capacity of only 30 GB, even though it could otherwise be added at full capacity. After some infant mortality period during which the server has been actively exercised, server 3 is reassigned an available capacity of 300 GB and the routing table governing its storage assignments is recomputed. We are now in the situation of Storage System #2 of FIG. 5, with R=2, and the full capacity of all servers is available.

Note that address range migration during planned storage additions and removals is not a safety issue, since source data need not be deleted until after a new copy of all data in the range being migrated has been made. In this case, all data modifications are written to both old and new locations during the migration process.

Structure of the Table

For convenience, the table is constructed with a power-of-two width. This means that lookups into the table can be performed using $\log_2 W$ bits of the block address as the column number. In the disclosed implementation an initial segment of the block address is used for this.

Each column of the table is an ordered list of R stores assigned to a corresponding address range. A sample table for Storage System #3 of FIG. 5 is shown in FIG. 10. For illustrative purposes the tolerance T has been set to 10%. To guarantee that this tolerance can be met, we must have $W \geq D/RT = 40/3$ and so we pick W=16, which is the next higher power of two. Each column is labeled with an address range: the R redundant components for blocks with identifiers that fall in an address range are assigned to the R stores listed in the corresponding column. Ideally, each store should have a fraction of the 48 entries in the table that exactly matches its fraction of the total available capacity. These ideal numbers of entries are listed in the first column (the $P_{i,j}$'s are ideal numbers of times stores should appear together, and are discussed in the next section). The actual number of times each store appears in the table are listed in the second column. Note that these are all within the given tolerance of the ideal. The most over-represented store is either store 3 or store 4; they are each 3% over-represented. When one of these is full, the clique is considered to be full. Since each has a capacity of 100 GB and 11 entries, each entry represents (100/11)GB. If storage is exactly proportional to representation in the table, then since the whole table has 48 entries, the available capacity of the whole table is 48(100/11)GB=436.4 GB. The available capacities of each of the stores is computed similarly. With a maximum over-representation of 3%, the available capacity is 3% less than the ideal maximum.

Each of the R stores assigned to a column plays one of R different roles (redundant component #0, redundant component #1, etc.). Since some roles may involve more storage work than other roles (e.g., low numbered components may be preferentially retrieved), the work load of the stores in a column can be equalized by assigning the R roles to the R stores pseudo-randomly for each block address, based on a portion of the block address (in the disclosed implementation, the fifth byte $b_5$ of the block address is used for this purpose).

Thus to find the store assigned to hold redundant component n for a block address that falls into the address range covered by column k, store_for_redundant_component(n)=table_entry((b_5+ n) modulo R, k)

The entry for the store is located directly from the block address, the component number, and R.

Suppose the routing table is changed in response to some addition or removal of storage capacity. Since the copying or recreation of redundant components on newly assigned stores takes some amount of time, there will be a period during which information in the old table remains relevant. For example, if new storage is added to the system, redundant components for an address range that is migrated onto the new hardware are sourced from the store recorded in an entry in the old table and copies to the store recorded in the corresponding entry in the new table (the new store takes over the same storage roles). Redundant components stored on the old store are not removed until the transfer is complete. Once the entire process of transitioning authority/responsibility for address ranges (called an authority transfer) is complete, the old table may be discarded.

Terminology Used in the Algorithm

Target Values

Target values for the distribution of entries and pairs of entries are not used explicitly by the algorithm: targets for these are implicit in the choices that are considered better or worse in the operation of the algorithm.

The target value for the number of entries for the store i is the non-integer value $$e_i = (\alpha_i / A_{tot}) E_{tot}$$

where $\alpha_i$ is the available capacity of the store, $A_{tot}$ is the total available capacity of the clique (equal to the sum of the available capacities of all stores) and $E_{tot}$ is the total number of entries in the table (equal to the table width W times the number of redundant components R). Thus the target is that each store is represented in exact proportion to its share of the total available capacity. As discussed earlier, this target value cannot be exactly achieved because of quantization of address ranges, but wasted space can be kept within a tolerance T as long as the table has enough entries.

The target value for the number of times store i is paired with store j is Approximately $$p_{ij} = (\alpha_i / A_{tot})(\alpha_j / A_{tot}) E_{tot}(R-1)$$

If all pairings were allowed, then (for example) summing $p_{ij}/(R-1)$ over j would involve summing $\alpha_j/A_{tot}$ which gives 1, and leaves us with just the definition of $e_i$, as expected. Since some pairings are disallowed, some values of $p_{ij}$ are forced to be zero and other pairings must be increased to compensate. Nevertheless, as long as the fraction of disallowed pairs is small compared to the allowed pairs, this gives an excellent approximation for the ideal distribution of allowed pairings. Expected and observed values of $p_{ij}$ are given in FIG. 10. The number of disallowed pairs is rather significant with the small number of stores in the example.

Over- and Under-Representation

A store i is said to be over represented if the actual number of entries $e^*_i$ corresponding to store i is greater than $e_i$; if $e^*_i$ is too mall, the store i is said to be under represented. Assuming that the amount of data allocated to a store is strictly proportional to the number of entries it has in the routing table, as data is written to the clique the most over-represented store will fill first. Since the clique is taken to be full when any store is full, the most over-represented store is the one that limits the total available capacity of the clique.

Because $e^*_i$ is an integer whereas $e_i$ is not, stores will generally be either over-represented or under-represented. If the tolerance T for wasted space is 1%, then any store that is less than 1% over-represented will not limit the total storage, to within tolerance. For this reason, over- and under-representation is always measured as a fraction, compared to available capacity: if $e^*_i/\alpha_i > e^*_j/\alpha_j$, then store i is more over represented than j. Thus if store i is much smaller than store j, it might be more over-represented than store j even though it has fewer extra entries in the routing table. The primary goal of the algorithm is to make the maximum ratio of $e^*_i/\alpha_i$ as small as possible. Note that this does not require a comparison with a target, only comparisons between the value of this ratio for different stores. As long as the table contains enough entries (E>D/RT), the maximum over-representation is guaranteed to be less than the tolerance T.

Similarly, in deciding which pairings are most over or under represented in the routing table, the relative sizes of stores must be considered. There is an ideal ratio of $p_{ij}/\alpha_i\alpha_j$ which depends only on $E_{tot}$ and $A_{tot}$ and R. In comparing the representation of pairings, we compare these ratios. Again we seek primarily to reduce the greatest over-representation: over-pairing may require that some store source more than its fair share in a recovery, and may also require the total number of address ranges transferred in a recovery by all stores to be increased. As with $e^*_i/\alpha_i$, comparisons between values of the pairing ratio for different i and j are used, rather than comparisons with a target.

The Algorithm

The new routing table is generated starting from the preexisting routing table used as the first approximation. The approximate table is updated iteratively by replacing entries one at a time. No change is ever made which violates restrictions on which stores are allowed to pair. The primary goal of the algorithm is to produce a table with the largest possible available capacity. The secondary goal is to accomplish this with the smallest amount of rearrangement of address ranges as possible. The tertiary goal is to produce a table where stores are paired as evenly as possible.

A greedy algorithm is used to accomplish these goals. At each step the most over-represented store is replaced somewhere in the table. Only replacements which reduce the maximum over-representation are performed. Better replacements may supersede previous replacements. When there is a choice among replacement candidates, pairing is taken into account. To improve the result, the search proceeds by first trying replacements that provide the most scope for future choice. The algorithm ends when no possible replacement will further reduce the maximum over-representation.

FIG. 11 is a pseudocode description of the routing table update algorithm. The program will be discussed one section at a time.

>> initialize OldTable and NewTable;

Before beginning the update, OldTable and NewTable are initialized. If the clique is new, they are both created and filled with a special entry called NULLSTORE, which is a reserved store number representing a non-existent store with zero capacity. If stores are being removed from an existing clique, they are replaced in NewTable by NULLSTORE. Stores that have failed (and so cannot source any data) are also replaced in OldTable by NULLSTORE.

>> widen NewTable is necessary;

If there will be a total of D stores represented in the new table and a wasted-space-fraction tolerance of T, then the number of entries in the table must be at least D/T. If NewTable is too small, its width is doubled some number of times until it is wide enough: for each doubling, each address range is split in two, with the entries for each half-range initially the same as the entries for the range that was split. If the table has reached its maximum width it is not split, and the tolerance constraint is no longer guaranteed to be met. With a tolerance of 1%, a table with a million entries is sufficient for representing up to 10,000 stores.

>> tabulate statistics;

The algorithm operates by mutating NewTable one entry at a time. The choice of which store to replace, what to replace it with, and where to make the replacement in the table, are all made based on statistics which are updated after each replacement. The statistics that are used are the number of entries where each store appears, the total number of entries in the table, the available capacity of each store, the total available capacity of the clique, and the number of times each pair of stores appears together in the same address range. These statistics are tabulated before the algorithm begins.

>> let S={list of stores in NewTable or being added};

The algorithm operates on a list of identifiers for all stores that will appear in NewTable. This list includes any stores that do not appear in OldTable but are being added.

>> begin loop UPDATE_TABLE

We allow conditional exit from the middle of the table update. We will exit when we can't make any further improvements to the table.

```
>> let Target =    most over-represented store in S
>>                 (in case of tie: use latest in list);
```

It is most over-represented store which limits the available capacity of the entire clique (it will fill up first). We choose this as our target to be replaced.

>> let S_r=S without Target

This list of candidates for the Replacement store is initially all stores except the Target store.

>> begin loop UPDATE_COLUMN

We allow conditional exit from the middle of the loop to update a column. As soon as we find a Replacement and a place to make it in the table, we will immediately exit so that we can pick a new Target.

```
>>  repeat
>>      if (size{S_r}=0) then exit UPDATE_TABLE;
>>      let Replacement = select one store from S_r;
>>      remove Replacement from S_r;
>>  until (replacing Target with Replacement would reduce
>>         the maximum over-representation in NewTable)
```

We consider all possible choices for the Replacement store until we find one that would improve the over-representation statistic for the table, or until we run out of choices. If we can't find a Replacement that helps, then we are done updating the table. To see if having one more instance of Replacement and one less instance of Target is an improvement, we verify that if we add one more instance of Replacement to the table, this won't make it more over-represented than Target was, i.e., $$(e^*_{Replacement}+1)/\alpha_{Replacement} < e^*_{Target}/\alpha_{Target}$$

The order in which stores are selected from S_r can be adjusted either to minimize the time taken to generate a table, or to minimize the effect of the proportionate representation constraint in meeting additional constraints. For fastest table generation, the order of preference for which element of S_r to select is 1) Most under-represented store.
2) Biggest store on biggest server.
3) Lowest numbered store.

Higher numbered preferences are only considered if lower numbered preferences haven't produced a unique choice. The elements of S can be sorted by store/server size, to make (2) more efficient. If constraints other than proportionate representation of each store in the table need to be met, reversing the first and second preferences leaves the most room for choice in subsequent steps of the algorithm.

```
>> let Columns =  {list of columns in NewTable that contain
   Target,
>>                and where the non-Target stores can be
   paired
>>                with Replacement};
```

Now that we have a Replacement candidate store in mind, we actually look at NewTable and find all of the columns where Target occurs and where we're allowed to replace Target with Replacement. The only thing that disallows a replacement is our set of pairing constraints. This is normally the constraint that two stores on the same server can't appear in the same column: If one of the stores other than Target is on the same server, that column is not allowed.

Note, however, that if the number of servers is less than R, we may want to weaken the pairing constraint. For example, a weaker constraint might be that a store can't appear in the same column twice. This would still allow recovery from a failed store. The constraint would only be changed during initialization, before beginning the UPDATE_TABLE loop, and would be reflected in the computation of the available capacity statistics.

```
>> if (size{Columns}>0) then
>>    let TheColumn = select one column from Columns;
>>    replace Target with Replacement in TheColumn of NewTable;
>>    update statistics;
>>    exit UPDATE_COLUMN;
>> endif
```

If we have at least one member in the list of candidate Columns, then we will pick the best one and make a replacement. If the list is empty, we continue the UPDATE_COLUMN loop and will try to find a new candidate Replacement store from the list S_r of remaining stores that we haven't tried yet.

If there is more than one choice in the list Columns, then we use a series of preferences to narrow the choice to a single column.

1) If there is a column in which Target is present as the result of a previous replacement, we narrow the choice to that column. This would improve the replacement without changing an extra entry. If there is no such column, we don't narrow the choice.

2) If we haven't yet narrowed down to a single column, we will now select the column for which over-pairing would be most reduced. We do this by first selecting the column where making the replacement least-worsens the over-pairing:

For each candidate column, compute max of $(p_{Replacement_j}+1)/\alpha_j$ for all stores j that appear in the column. Pick the column where this value is least.

3) If more than one column has the same least value, we next select the column where removing the Target most-improves the over-paring:

For each candidate column, compute max of $(p_{Target j}-1)\alpha_j$ for all stores j that appear in the column. Pick the column where this value is greatest.

4) If there is still more than one column left, select the highest numbered column.

If a table with better pairing is considered more important than a table with the absolute minimum number of changes (i.e., least reshuffling of data between stores), then (1) should be moved after (3).

Once the best column is selected, make the change by replacing Target with Replacement in the selected column of NewTable. Increment $e^*_{Replacement}$, decrement $e^*_{Target}$, and update affected $p_{ij}$'s. Since we have successfully updated a column, we exit the UPDATE_COLUMN loop and go find another Target to improve.

>> endloop UPDATE_COLUMN
>> endloop UPDATE_TABLE

Repeat or exit, depending on what happened within the loop.

Hierarchical Storage Systems

If the scale of the storage system exceeds the amount of storage that can be conveniently protected by a single tightly coupled group of servers (for example, the number of servers that can be plugged into a single network switch), then a hierarchy of routing tables may be used to organize storage and redundancy.

Aggregation at each level of the hierarchy works exactly as above: a single routing table governs a group of storage systems to apportion blocks assigned to the group among its constituents. The lowest level constituents in the hierarchy are the blockstores, at the next level are cliques of blockstores, then cliques of cliques, etc. The grouping of blockstores into servers is not considered a separate level, but is instead handled as an extra constraint on table generation at the first level of aggregation.

Figure 12:
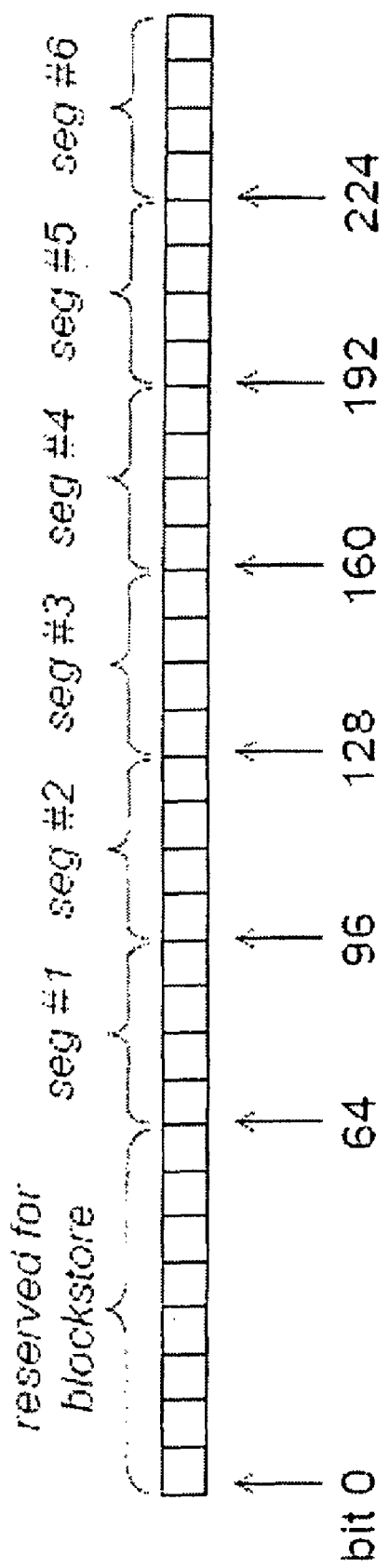
FIG. 12 illustrates a 256 bit block address divided into independent address segments used for indexing into different routing tables in a hierarchical storage system.

To guarantee that the addresses used for routing at each level of the hierarchy are independently random, a different portion of the block address is used at each level. This is illustrated in FIG. 12. Here a 256-bit block address is divided up into six 32-bit address segments, with the initial 64-bits not used for routing so that each blockstore will see a random distribution of block addresses. At each level of routing a different address segment is used to index into the routing table.

A hierarchical storage system is naturally described from the top down. In our notation we will let S be the top level storage system S[i] the $i^{th}$ of the second-level storage systems that constitute S, S[i][j] the $j^{th}$ constituent storage system of S[i], and so on. Using this same notation, if D is the number of second-level storage systems that constitute S, then D[i] is the number of constituents of S[i], D[i][j] the number of constituents of S[i][j], and so on. Similarly, R is the number of redundant components used in S and R[i] the number used in S[i], and A is the total (ideal) available capacity of S and A[i] the total (ideal) available capacity of S[i], etc.

Each component stored at one level is redundantly encoded with some overhead at the next level. Thus the usable capacity C seen at the top level S is computed by decreasing the actual available capacity A* by the storage overhead used by redundancy at the top level. In computing A*, the usable capacities C[i] of the constituent storage systems S[i] play the role of raw capacities, since the storage overhead used to redundantly encode components within S[i] does not appear as usable space at the top level. Similarly, at each level usable capacity of a constituent storage system is computed from its actual available capacity by discounting for redundancy overhead, and usable capacity plays the role of raw capacity in computing ideal available capacity at the next level of aggregation.

Figure 13:
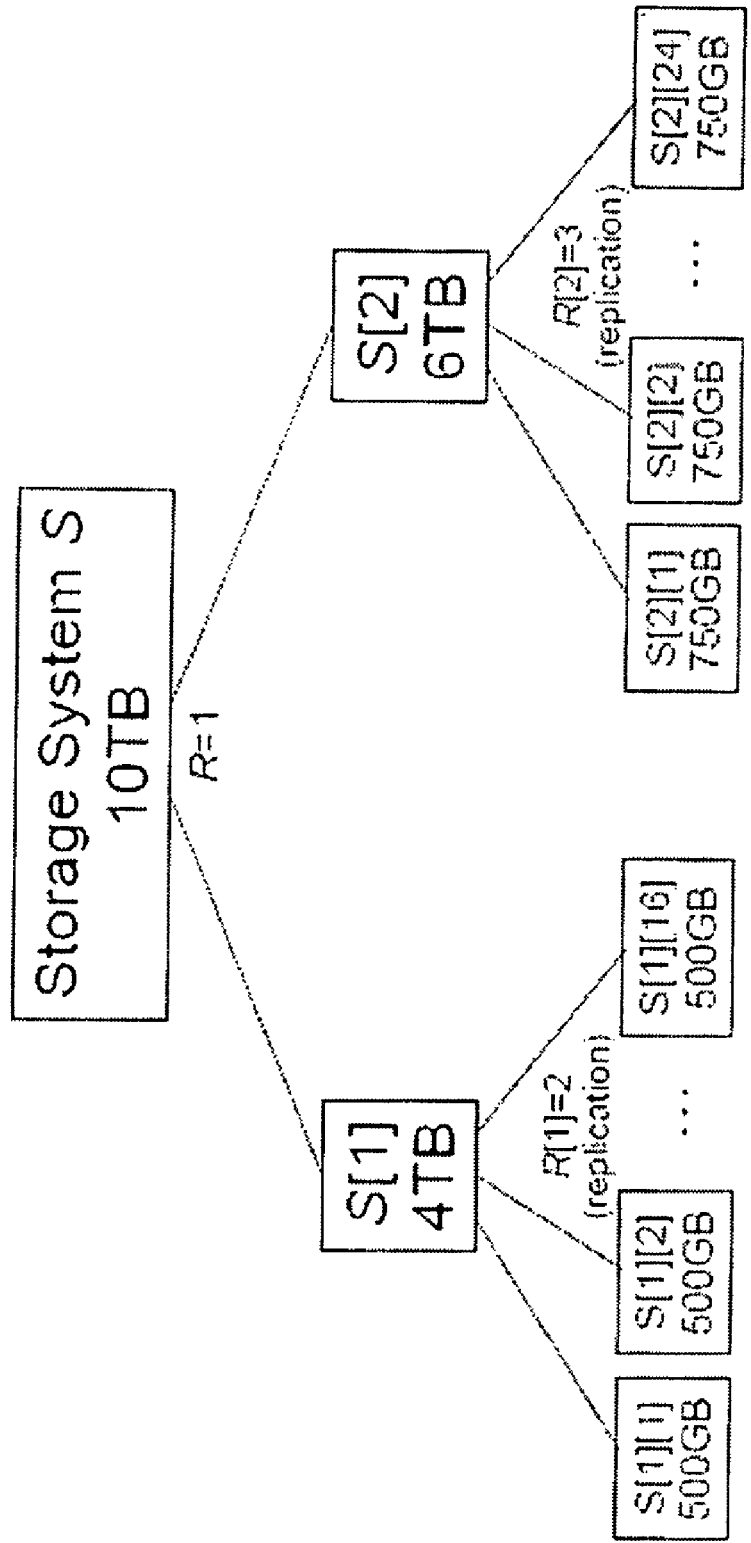
FIG. 13 illustrates a hierarchical storage system with two levels of routing, with no redundancy used at the top level and replication used at the second level.

In real storage systems we will normally set the tolerance T to be small enough that we can neglect the difference between actual and ideal available capacity. We assume this in the example of a hierarchical storage system with two levels illustrated in FIG. 13. The top level has D=2 cliques with R=1 components representing each block. With no redundancy at the top level, storage is simply divided between the two cliques, with address responsibilities apportioned in proportion to the usable capacities C[1]=4TB and C[2]=6TB. At the second level, we assume in this example that the R[i] redundant components representing a block are full replicas of the block (see FIG. 4, example 1). Clique S[1] has D[1]=16 stores each with a capacity of 500 GB, yielding an available capacity A[1]=8TB. Since R[1]=2 (replication), the usable capacity C[1]=4TB. Similarly, clique S[2] has D[2]=24 stores, each with a capacity of 750 GB, yielding an available capacity of 18TB and, with R[2]=3 (replication), a usable capacity of 6TB.

Continuing with our hierarchical notation, NewTable is the routing table used within S, NewTable[i] is the routing table used within S[i], etc. NewTable divides the total address space among the D second-level storage systems that constitute S. NewTable contains at least D/T entries, in order to allow the top-level storage system S to achieve its ideal available capacity, to within a tolerance T. If the capacity of S[i] increases, then address ranges are migrated from other constituent storage systems of S. If R=1, then the loss of one constituent storage system at the top level will lose data, but if each S[i] is sufficiently reliable, this remains a reliable configuration. As discussed earlier, when NewTable is regenerated to reflect a transfer of authority for some address ranges, data is first copied and then, when this transfer is complete, and S[i] that is no longer authoritative can delete the data for the ranges it has given up. If R>1, then each block at the top level is represented by storing redundant components on more than one S[i].

At the second level, NewTable [i] of S[i] divides up the space of all addresses assigned to S[i], allocating addresses to the D[i] storage systems that constitute S[i]. NewTable[i] has at least D[i]/T entries. When new address ranges are assigned in NewTable to a constituent storage system S[i], corresponding components are stored there. These components are redundantly encoded with S[i] and the resulting components are apportioned by NewTable[i] among the constituent storage systems that make up S[i]. Other levels work in a similar manner. Since the address-segments used to index the routing tables at different connected levels of the hierarchy are independently random (FIG. 12), each address range assigned to a constituent storage system at one level is divided up evenly at the next level among that level's address ranges.

Figure 14:
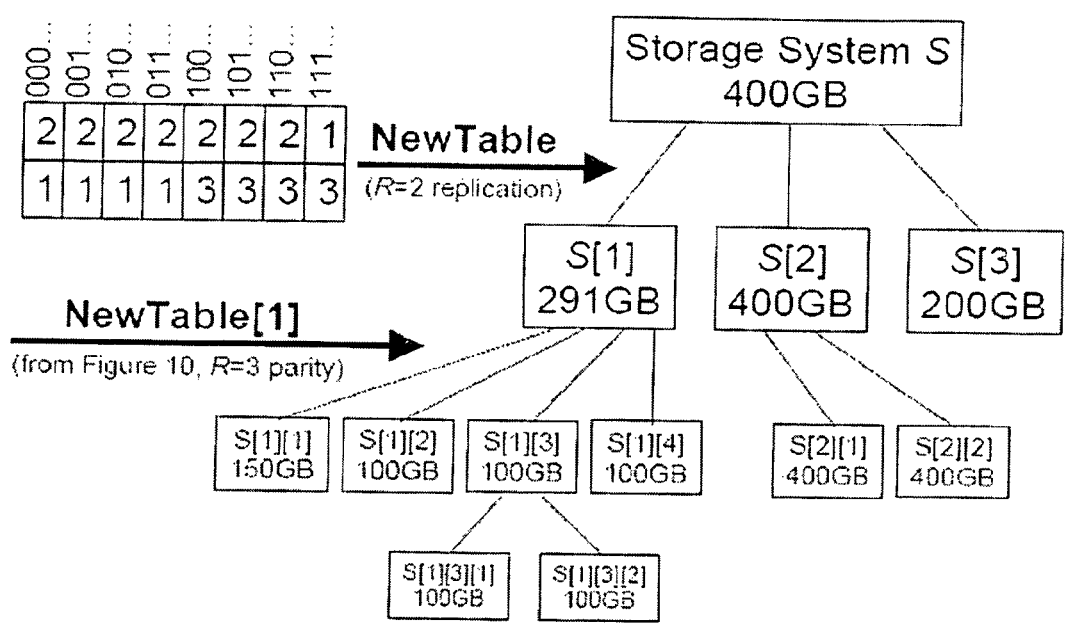
FIG. 14 illustrates hierarchical construction of a storage system with a hierarchy of routing tables.

A hierarhical storage system with multiply routing tables is illustrated in FIG. 14. At the top level in the illustration we have three constituent storage systems, with capacities of 291 GB, 400 GB and 200 GB and R=2, yielding an ideal available capacity for the entire storage system of 891 GB. A sample top-level NewTable is shown which gives an actual available capacity of 800 GB. In general a table this wide is not guaranteed to get closer than about 19% to the ideal. A second level NewTable[1] for S[1] is given in FIG. 10. The 436 GB actual available capacity A*S[1] depends on the capacities of its constituent storage systems and on the width of the routing table: a NewTable[1] that was 1024 columns wide could have approached the ideal 450 GB of available capacity for S[1] to within about 1/10 of a percent. If we assume that the redundancy with S[1] is an extra parity block (see FIG. 4, second example), then the usable capacity C[1] is 2/3 of A*S[1], so that C[1]=291 GB. This is the capacity that plays the role of raw capacity in calculating the actual available capacity A*=800 GB at the top level (FIG. 14). Since the top level routing uses R=2 (replication), the usable capacity of the storage system illustrated is C=4000 GB.

As was discussed earlier, each level of routing is indexed using a different segment of the block address, in order to independently apportion blocks to storage at each level in proportion to the representation of storage by entries in the routing table. In the example of FIG. 14, the three constituent storage systems at the top level are of three different depths: S[1] has two levels of routing, S[1] has one, and S[1] has none. By convention, address segments are allocated to routing levels from lowest level to highest using the lowest-numbered segment that can be used at the time of the allocation. Thus if the storage system was initially defined as illustrated, the routing with S[1][3] would use segment 1, within S[1] segment 2, within S[2] segment 1, and within S (the entire storage system) segment 3. If, on the other hand, S[2] and S[3] constituted the original storage system and S[1] was added later, then the allocation of address segments would be different: the routing within S[2] would use segment 1, within S segment 2, within S[1][3] segment 1 and within S[1] segment 3. This convention avoids unnecessarily reallocating blocks within a storage system when it grows hierarchically.

Consider, for example, a block being stored into S that has an address with the value "011 . . . 1" in the segment used for the top-level routing, and "1101 . . . 01100011" in the segment used for the second level routing. We'll assume here that, at each level, the last eight bits of the segment address are used to randomize the role number (rather than a fixed byte as was discussed earlier). Suppose at the top level we're interested in the redundant component playing role 0. According to NewTable in FIG. 14, this component is assigned to S[1]. With S[1] this component is encoded as three new components (all still having the same block address). Assume that at the second level we're watching component 2. Since "01100011" equals 0 modulo 3, component 2 is assigned to S[1][4] by NewTable[1] in FIG. 10.

In the hierarchical system illustrated in FIG. 14 the leaf nodes of the hierarchy are blockstores: S[1][1], S[1][2], S[1][3][1], S[1][3][2], S[1][4], S[2][1], S[2][2] and S[3]. Because separate segments of the block address are used for defining address ranges at each level of the hierarchy, and address range used for routing at any level will correspond to a particular pattern of bits in a particular portion of the block address, with no constraint on the rest of the address. For example, all components assigned to the address range "011 . . . " in NewTable of FIG. 14 will have the pattern "011" as the first three bits of the address segment used for top-level routing. Thus if any constituent storage system at any level loses responsibility for an address range, a bit-pattern mask can be passed hierarchically all the way down to its blockstores, telling them that they can delete any block with a name that includes the specified pattern. Similarly, if a list of names of blocks in an address range is needed, the corresponding bit-pattern can be passed down to the blockstore level, and a list returned.

The preceding discussion of hierarchical storage systems is relevant to the related patent application US2004/0167898A1, Margolus et al., "History Preservation in a Computer Storage System," which is incorporated here by reference. Each level of hierarchy described here comprises a distributed storage system that could implement the kinds of protections described in the related application. The routing table just specifies which storage constituents are responsible for holding redundant information for other storage constituents. To detect compromise of individual storage constituents, reads could involve reading enough redundant components stored on different constituents to verify the integrity of the data read. If a problem is detected, additional components could be read to determine where the problem is.

Encoding and Use of Reduction Components

A block stored in the clique is represented by some number of redundant components, in order to allow recovery of lost components in the case of a hardware failure. The processes using the routing table need to know the encoding used by the components in order to reconstruct the original block for the purposes of access or recovery. We discuss here the form and usage of some encodings that are supported by the routing table structure discussed above, focusing on two new kinds of encodings that are particularly well suited to distributed storage applications.

Identical Replicas

The simplest redundant encoding is replication: each redundant component representing a stored block is a complete copy of the entire block. For R=2 this is essentially the only possible form of redundancy, since being able to survive the loss of one of the two redundant components means that each component has to encode all of the information in the original block.

Storage of replicas has the advantage of simplicity and allows fast recovery from a single hardware failure, since no computational work is needed to reconstruct stored blocks from redundant components. It has the disadvantage that the ability to withstand R−1 simultaneous hardware failures request using R times as much storage as is needed for a single copy of everything.

For replicated storage, recovery from a failure proceeds by first identifying sources for the address ranges that were lost and copying the data to the stores that are newly authoritative. For each column in NewTable, new entries represent the stores that are newly authoritative for the corresponding address range. Which entries are new can be determined by comparing NewTable with OldTable. If NewTable was widened, then each column in Old Table corresponds to more than one column in NewTable. Failed storage is represented by NULLSTORE in OldTable, so it is always clear which stores remain valid sources. If storage is removed in a scheduled manner (called a controlled leave) then entries for the stores being removed remain in OldTable but not in NewTable.

For robustness in case of additional failures, it is convenient to have all new writes replicated to all stores that are assigned to an address range, either in NewTable or OldTable. Once all newly assigned stores have copies of all the redundant components assigned to them, the process of authority transfer is complete: NewTable is copied to OldTable and any redundant components residing on stores that are not authoritative for them can be discarded. If there is an additional failure during the authority transfer, OldTable is not changed but NewTable is modified using the algorithm described above. For each entry that differs between OldTable and NewTable, only the redundant components which have not yet been transferred to the newly authoritative stores need to be transferred.

Erasure Resilient Encoding

A redundancy scheme that is used widely for increasing fault tolerance in storage without using a lot of extra storage space is parity-RAID. In this scheme, each block of data being protected is broken up into N equal sized fragments. One extra component is created in which each of its bits is the sum, modulo 2, of the corresponding bits of the original N fragments. These n+1 components are now redundant: if any one of them is lost it can be reconstructed by adding together corresponding bits of the remaining N components, modulo 2. The N+1 redundant components are stored on N+1 separate pieces of hardware. All blocks of data written to the storage system are protected in this manner. If any one of the separate pieces of hardware fails, all of the blocks of data written to the storage system can be reconstructed.

Parity-RAID is an example of an erasure resilient encoding. In general, a block of data is broken up into N fragments and the M extra components are created from the original N. Up to M of the N+M redundant components can be erased and the encoding allows them to be reconstructed from the remaining components. For some erasure resilient schemes, any M components can be erased and recovered. Some other schemes reduce encoding/decoding effort by allowing some combinations of M lost components to be unrecoverable and instead make a lesser guarantee: in some cases, more than N components are needed in order to reconstruct the others.

Widely used erasure resilient schemes impose the constraint that the N fragments of the original block of data are used as N of the redundant components. This means that, when no component have been erased (i.e., no hardware failure), the original block can be reconstructed by simply accessing these N fragments, with no extra computational effort. Another constraint imposed in all widely used erasure resilient schemes is that all components, both original and derived, are the same size. This size constraint is unnecessary in a system which allows variable sized chunks of data to be stored. (Even in a fixed chunk-size system, it may be possible to simply increase the size of each stored chunk slightly, to accommodate extra data in some of them.) Thus we will consider schemes which don't obey this size constraint.

Regardless of which N+M encoding is used, the way it interacts with the routing table is essentially the same. When no failure has occurred, one or more of the unencoded first N components are read in response to a request to read all or part of a stored block. The use of a portion of the block address to assign component-roles to stores evens out the workload implied by this uneven use of components. The way that failures are handled is much the same as for identical replicas, but with some important differences.

If stores have been added or removed but no stores have failed, then the authority transfer process only requires copying corresponding components: one store is taking over another store's slot in a column, and it should get all of the blocks for the corresponding address range that belong to the store being replaced. This is just a copying process, and is essentially no different than what happens for identical replicas.

If one or more stores have failed, then missing redundant components will have to be recreated from the remaining components. As before, which entries in NewTable are new is determined by a comparison with OldTable. In general, for each address range that is newly assigned to a store, all of the redundant components for that address range from N of the other stores responsible for the same address range must be transferred to the new store. This will allow the new store to reconstruct all of the original stored blocks for that address range, and from these construct the one redundant component that it is responsible for storing.

Thus during recovery, for each new address range assigned to a store, the store must temporarily accumulate N components for every one that it is responsible for permanently preserving. This temporary storage requirement can be handled in various ways. In our disclosed implementation, extra storage is simply avoided. Instead of receiving all components from all N sources at once, the newly assigned store first receives all components from just one source, and stores these. This provides the new store with a complete list of all block addresses it needs, and take sup only storage space for a single component of each block. The new store then processes each of these components one at a time, requesting N−1 other components for the same block, reconstructing the missing component, and storing it. The redundant components of each block that remain intact protect the system from additional failures during this recovery process.

Simple Erasure Resilient Encodings

Conventional linear codes designed to withstand multiple erasures are significantly more complicated than a simple parity code. They are based on finite field operations that are not directly supported by conventional computer hardware. In one implementation, we use simpler encodings that use only ordinary arithmetic, logic and shifting, and treat entire components as large integers. The extra components that are added to provide redundancy are in some cases a few bits larger than the other components. These codes are efficient both for encoding and decoding. The simplicity of the algorithms and of the math involved are advantages for implementation and testing.

EXAMPLE

As a simple example, consider an N+M=2+2 code. Suppose each block of data being encoded is broken into two halves, A and B. Interpreting A and B as large integers, we can construct two extra components, X and Y:

$$X=A+B$$

$$Y=A-B$$

where + and − are ordinary 2's complement arithmetic operations. The components can be as large as desired. If A and B are n-bits long, X and Y need to be n+1-bits long. If n-bit components are labeled with a block type, the extra bit can be absorbed into the block type. If X and Y are lost, they can be recomputed from A and B using only addition and subtraction. Also, since $$A=(X+Y)/2$$

$$B=(X-Y)/2$$

if A and B are lost, they can be reconstructed using only addition, subtraction, and shifting (division by 2). If A and X are lost, $$A=Y+B$$

$$X=Y+2B$$

and similarly for the other cases. As long as the coefficients used to combine the components are small integers, coefficient multiplication can be implemented by a small number of addition and shift operations. If only power of two coefficients are used, only shifts and additions are needed for encoding.

A Larger Example

The block of data being encoded is broken up into four equal-sized components {A,B,C,D}, from which we construct up to four extra components {W,X,Y,Z} as follows:

$$W=1A+2B+4C+8D$$

$$X=2A+8B+1C+4D$$

$$Y=4A+1B+8C+2D$$

$$Z=8A+4+B2C+1D$$

These four equations are linearly independent; omitting any row (W, X, Y or Z) and any column (A, B, C or D) produces a linearly independent set; and omitting any two rows and any two columns produces a linearly independent set. Thus if any four out of the eight components are missing, we can solve for the other four. For example, if W, X, B and C are missing, we initially ignore the W and X equations and use the Y and Z equations to solve for B and C (two equations, two unknowns). Then we use the first two equations to reconstruct W and X. If we wish to construct fewer than four extra components, we use only some of these equations. This example requires each of the extra components W, X, Y and Z to be 4 bits longer than the pieces of the original block, A, B, C, and D.

Canonical Examples of Any Size

A set of M linear equations will produce M extra components that can be used as part of an erasure code as long as they allow all components to be reconstructed from any N of them. This will be true as long as every square submatrix of the matrix of coefficients (i.e., every square matrix formed by leaving out rows and columns) has linearly independent rows. If N is a prime number then any subset of the equations $$X_k = \sum_{j=0}^{N-1} 2^{jk \bmod N} B_j, k = \{0, 1, ..., N-1\}$$

will work, supplying examples with power of two coefficients for N as large as desired, M≦N. For instance, for N=5 this canonical formula yields:

$$X_0=2^0B_0+2^0B_1+2^0B_2+2^0B_3+2^0B_4$$

$$X_1=2^0B_0+2^1B_1+2^2B_2+2^3B_3+2^4B_4$$

$$X_2=2^0B_0+2^2B_1+2^4B_2+2^1B_3+2^3B_4$$

$$X_3=2^0B_0+2^3B_1+2^1B_2+2^4B_3+2^2B_4$$

$$X_4=2^0B_0+2^4B_1+1^3B_2+2^2B_3+2^1B_4$$

For a 5+3 code, we might use just the first three rows. For a 3+5 code we might treat $B_3$ and $B_4$ as always being zero. Leaving out columns in this manner also provides a systematic method for constructing codes for non-prime numbers of $B_j$'s.

We can represent the N=5 example by listing just the exponents that appear in the coefficients s an N×N matrix:

$$\begin{matrix} 0 & 0 & 0 & 0 & 0 \\ 0 & 1 & 2 & 3 & 4 \\ 0 & 2 & 4 & 1 & 3 \\ 0 & 3 & 1 & 4 & 2 \\ 0 & 4 & 3 & 2 & 1 \end{matrix}$$

Similarly, for any prime value of N our canonical formula for $X_k$ yields a matrix of exponents with the first row and the first column all zeros. We can derive simpler sets of coefficients for N one less than a prime by leaving out the first row and column: all the remaining coefficients are then divisible by 2, so we can reduce all the other exponents by one. The reduced matrix of canonical exponents for N=4 is thus $$\begin{matrix} 0 & 1 & 2 & 3 \\ 1 & 3 & 0 & 2 \\ 2 & 0 & 3 & 1 \\ 3 & 2 & 1 & 0 \end{matrix}$$

which is just a recasting of the 4+4 example from the previous section.

As a further simplification, we can take the reduced matrix of canonical exponents for N one less than a prime and replace any single row (or column) by a row (or column) of zeros, to obtain a simplified reduced matrix which will involve less shifting to construct the extra components:

$$\begin{matrix} 0 & 1 & 2 & 3 \\ 1 & 3 & 0 & 2 \\ 0 & 0 & 0 & 0 \\ 3 & 2 & 1 & 0 \end{matrix}$$

Note that, as long as we replace a middle row, all of these matrices will have a first row of {0, 1, 2, ...}, a last row that is the reverse of this, and some other row that is all zeros. We can use just these three kinds of rows to construct a code for M=3 for any N:

$$\begin{matrix} 0 & 0 & 0 & \ldots & 0 \\ 0 & 1 & 2 & \ldots & N-1 \\ N-1 & N-2 & N-3 & \ldots & 0 \end{matrix}$$

Consider, for example, N=12 and M=3. In this case, $X_0$ is four bits longer than the $B_1$'s and $X_1$ and $X_2$ are each 12 bits longer. For M=2 and any N, just use the first two of these equations. Note that using the first, second and last rows of the canonical matrix of exponents yields almost the same code for M=3, but with the last two rotated by one position. This alternative code is suitable for any odd N, but not for even N.

The transpose of any of the examples given above can also be used: for example, the method for constructing codes for any N+3 can also be used to construct codes for any 3+M. Any of these matrices of exponents can also have a constant added to all elements, or have all elements multiplied by a constant factor. Some additional examples of codes with positive power of two coefficients are given in FIG. 15. Notice that the second example (3+3) uses one fewer shift to encode than the generic N+3 code given above. The last example (3+6) encodes a block into 9 pieces, any 3 of which are sufficient to recover the block. This code can withstand 6 failures using the same amount of storage space as would be needed to store three replicas of the block: triple replication would only be able to withstand 2 failures. The second last example (6+3) would typically be a better storage compromise. It creates exactly the same number of redundant components as late 3+6 example, but the extra space used by the redundancy is only 50% of the block size, rather than 200%. This code can withstand 3 simultaneous failures.

Small Signed Coefficients

There may be an advantage in some cases to using smaller signed coefficients, rather than only positive numbers. For example, $$W1=A+1B+1C+1D$$

$$X1=A+2B-2C-1D$$

$$Y1=A-2B-1C+2D$$

$$Z1=A-1B+2C-2D$$

Compare this to the earlier example, $$W=1A+2B+4C+8D$$

$$X=2A+8B+1C+4D$$

$$Y=4A+1B+8C+2D$$

$$Z=8A+4B+2C+1D$$

In both cases, all coefficients are powers of two, so each multiplication can be performed with a single shift operation. In the first case, the shifts are slightly smaller. Using fewer coefficient values may be advantageous in some cases. For example, if we replace 2 by 256 in the first set of equations above, then $$W=1A+1B+1C+1D$$

$$X=1A+256B-256C-1D$$

$$Y=1A-256B-1C+256D$$

$$Z=1A-1B+256C-256D$$

and we can still solve for any four of the eight redundant components as a function of the others. All shifts in this case are by a whole byte amount, and so may be performed by byte addressing. In this case, if byte addressing is efficient then the encoding process can be about as fast as just adding A, B, C and D once for each extra component. If the original blocks are each n-bits long, then W is n+2 bits and X, Y and Z are each n+10 bits.

In general, the exponents in any of the earlier power of two examples can be multiplied by three if byte shifts are faster or more convenient and the extra storage overhead is acceptable.

Efficiency of Decoding

As discussed above, if no redundant components have been lost, the unencoded fragments of the original block (i.e., A, B, C and D) are retrieved and there is no extra work involved in reconstructing the block. If some redundant components have been lost, then in general, solving for missing components will involve division by a small integer. For example, if $$W=A+B+C+D$$

$$X=A+2B-2C-D$$

and both B and C have been lost and need to be recovered, then $$4B=2W+X-3A-D$$

Thus B can be recovered by dividing the sum of 2W+X−3A−D by 4. In this case the division can be performed in linear time (in the size of the block B) by a simple shift operation. If we were missing A and C, however, we would see that $$3A=2W+X-4B-D$$

and so recovering A involves performing a division by 3. This is not an efficiency problem, though, because division of an n-bit number by a small integer m can, in general, be performed if a time of order n log n (with a dependence on the size of m). This assumes that the number in question is exactly divisible by m, as in our case. For example, division of something that adds up to 3A by 3 can be performed by multiplication:

$$(\text{Three\_}A)/3 = -(\text{Three\_}A)*(-\tfrac{1}{3})$$

In two's complement notation, −1 is the n-bit number that is all 1's in binary (it's the number that, when you add 1, gives zero). Thus −⅓ is $$111111\ldots11/11 = 010101\ldots01$$

and, because of the regular repeating pattern, the multiplication of −(Three_A) by −⅓ can be performed with about log n shifts and adds, leaving us with A.

Just as is the case with decimal arithmetic, a rational fraction always has a repeating pattern, so we can always multiply by −1/m instead of dividing by me, increasing the value of n a little so that the repeating pattern from the division repeats an even number of times. Some examples where m differs by one from a power of two (i.e., m=$2^j \pm 1$ for some j) are listed. Here the left hand side of each equation is decimal, the right hand side is binary:

| | |
|---|---|
| $-\tfrac{1}{3} =$ | 0101 . . . 01 |
| $-\tfrac{1}{5} =$ | 00110011 . . . 0011 |
| $-\tfrac{1}{7} =$ | 001001 . . . 001 |
| $-\tfrac{1}{9} =$ | 000111000111 . . . 000111 |
| $-\tfrac{1}{255} =$ | 0000000100000001 . . . 00000001 |
| $-\tfrac{1}{257} =$ | 0000000011111111000000001111111 . . . 0000000011111111 |

Notice that, for m=$2^j-1$, we get repetitions of a j-bit pattern consisting of j−1 zeros followed by a single 1; for m=$2^j+1$ we get repetitions of j zeros alternating with j ones. The m=255 and m=257 cases are the only ones that are needed (other than shifts) for inverting the encoding used for the N+M=4+2 case:

$$W=1A+1B+1C+1D$$

$$X=1A+256B-256C-1D$$

An XOR Encoding

There are other simple erasure-resilient encoding schemes that slightly inflate the size of the extra components in order to make encoding or decoding faster. An attractive alternative encoding simply replaces addition of integers (plus shifting) with sum-mod-2 of corresponding bits (plus shifting).

In all of the arithmetic encoding examples given above with positive power of two coefficients, if the coefficients are left unchanged and the plus operation in the summation is replaced by the sum-mod-2 of corresponding bits (and multiplication is left unchanged), then the examples remain easy to compute and easy to invert. This includes all of the examples that derive from the canonical formula for power of two coefficients, the reduced and simplified variants, etc. Consider the third example from FIG. 15, $$X=A+B+C+D$$

$$Y=A2+B+4C+8D$$

The multiplications are still shifts and the additions are now XOR operations. In this case, X is exactly the same size as the components it's constructed from, and Y is 3 bits bigger. If A and B have been lost, then let $$X'=X+C+D, \text{ and}$$

$$Y'=Y+4C+8D$$

which are easily computed from the remaining components. Then $$X'=A+B, \text{ and}$$

$$Y'=A+2B$$

and so $$X'+Y'=B+2B$$

and if the bits of B are $\{B_0, b_1, b_2, \ldots\}$, then the bits of B+2B are $\{b_0, b_0+b_1, b_1+b_2, b_2+b_3, \ldots\}$. Thus B can be recovered by adding the first bit of B+2B to the second, the result of that to the third, the result of that to the fourth, etc. A can then be recovered using A=A'+B. If any other pair of blocks are lost, they can be reconstructed in a similar fashion. The general case, with any number of coefficients, is similar and can be solved by adding together multiples of equations, using the identify Z+=0 to eliminate terms until only the sum of shifts of one block remain. The bits of that block are then computed in a manner similar to the bits of B above.

Note that in this XOR scheme, as before, replacing bit shifts by byte or word shifts may make the encoding and decoding faster, at the expense of wasting slightly more space in storage of the extra components.

Note also that non power-of-two coefficients can be used in this scheme. For example, we define 3B=(1+2)B=B+2B, where + remains XOR. In general, if $\{c_0, c_1, \ldots\}$ are the bits in the binary representation of a number C, then $$C=c_0+c_1 2^1+c_2 2^2+\ldots$$

where + is the bitwise XOR. As before, for powers of two, $2^i * 2^j = 2^{i+j}$. For non powers-of-two, we define the rules for multiplication by combining this representation with the distributive law and the rules for addition. For example 3+3=(1+2)(1+2)=1+2+2+4=5, since 2+2=0. Thus 3(3B)=5B). Both addition and multiplication are commutative and associative, and multiplication distributes over addition. This mathematical structure is called a commutative ring with identity, and it behaves in many ways like ordinary addition and multiplication of integers. For example, the matrix of canonical coefficients defined in the previous section, multiplied by the vector of integers $B_j$, yields the vector of extra components $X_k$, $$X_k = \sum_{j=0}^{N-1} 2^{jk \bmod N} B_j, k = \{0, 1, \ldots, N-1\}$$

where the addition in the summation is now XOR (but the arithmetic in the exponent that defines the coefficients is unchanged). The matrix of coefficients (or a square submatrix of it) can be seen to have linearly independent rows by computing the determinant (over this ring) and seeing that is non-zero.

Since there are no carries involved in this encoding, it is more easily parallelized than the one using ordinary addition. The decoding is simple for all N.

Decoding is compared for the normal arithmetic and bitwise XOR schemes in FIG. 16 with a 3+3 code, which could be used indifferently with either scheme. The $X_i$'s are constructed by splitting a block B into three fragments and adding them together with power of two coefficients. We illustrate a decoding where all three of the fragments of block B are lost and need to be reconstructed. The number of operations on coefficients needed to reconstruct $B_j$ by Gaussian elimination is the same in both cases. The final step in the arithmetic case is a division by 6 (which is essentially the same work as a division by 3). In the bitwise-XOR case, the final step is separating the XOR of two shifted copies of B, already discussed in an earlier example. Separating more than two shifted copies of B is not much more work.

Performance Comparison

For our storage clustering application practical block sizes are relatively large (many kilobytes) and the erasure codes must be sufficiently robust to allow the system to survive a small number of additional failures while it recreates lost components. Acceptable storage overhead for the extra components might range between 10% and 100%.

With these constraints, N+M erasure codes with relatively small values of N and M are of greatest interest, and formulas for all possible combinations of lost components can be precomputed. For example, if $B_2$ and $B_5$ have been lost, the formula for reconstructing $B_2$ might be $$7B_2 = 12B_1 + 10B_3 + 3B_4$$

Thus the only relevant performance parameters are the time needed to encode the components (i.e., compute the $X_k$'s) and the time needed to decode missing components from the remaining components.

For encoding, both the arithmetic and XOR codes are essentially optimal N+M erasure codes in the case where all coefficients in the encoding matrix are powers of two (i.e., shifts). Making the shifts be multiples of a byte or a word may be somewhat advantageous, but since modern CPU's can shift a word by any amount in a single machine instruction the advantage is likely to be small. With shifts of multiples of a byte or word done by addressing, encoding each $X_k$ takes about the same amount of time as is needed to read the block being encoded from memory and write the resulting component back to memory.

Decoding involves two steps: computing a multiple of a missing component from remaining components (e.g., adding $12B_1 + 10B_3 + 3B_4$ in the example above), and then reconstructing the missing component from the multiple (e.g., "dividing"$B_2$ by 7 in the example).

Computing a multiple of a missing component is very similar in both the arithmetic and XOR cases: a formula in terms of remaining components is evaluated. For small coefficients it is advantageous to use shift and "add" for the multiplications. If the coefficients are all about the same size, then we can estimate the number of ones in each coefficient to be about logm, where m is the coefficient of the missing component in the formula being evaluated. Since N remaining components are sufficient to recreate any missing component, the time taken for this step is no more than Nlogm times the time it takes to copy a component. For likely values of N the components can all be scanned in parallel, with a window of data buffered in registers and the words of the result written back to memory. In this case, because of the speed of register operations compared to memory operations, the time taken may be close to that needed to merely read all of the N necessary components and write the result.

For reconstructing a missing component from a known multiple of the component, the arithmetic and XOR cases differ. For the arithmetic case, we turn a division by a small coefficient m into a multiplication by an integer as long as a component, with a pattern that repeats that is about as long as m. Multiplying by this pattern once using shift and add takes no more than logm times as long as copying a component. Again, the time can be significantly less since this operation can be performed by scanning once across the component being multiplied, keeping several words of the component in registers while the pattern is being applied to create each word of the result in turn.

Once the multiple of the mixing component has been multiplied by the pattern once, multiplication by the repetitions can be computed by shift and add in about logn times the time needed to copy a component, where n is the length of a component. Thus the overall reconstruction of the missing component takes at most lognm times as long as a copy. Since logn is assumed to be much bigger than logm, and since logm is multiplied by a factor that is less than one to account for the speed of register operations versus memory operations, we will call this time logn times as long as a copy of a component.

In all of this, the use of byte or word wide shifts would have very little effect on the time needed to decode a missing component.

For the XOR case, the size of shifts may matter more, since the decoding operation is inherently serial. In our example above, the shifts are single-bit shifts, and the bits of $7B_2$ are $\{b_0, b_0+b_1, b_0+b_1+b_2, b_1+b_2+b_3, b_2+b_3+b_4+\ldots\}$. The operations needed to reconstruct $B_2$ move linearly down the string, operating locally on one portion at a time, performing 2 XOR operations on each bit in turn. If the shifts were instead k-bits wide, the operations would update k bits with each machine operation. Since, however, the operations are all local and all of the data that equals $7B_2$ needs to be read only once, and $Bb_2$ only needs to be written once, the actual advantage of wider shifts depends on how many register operations can be performed in the time it takes to read a word and write a word of memory. In general, since the number of XOR operations needed per bit is about logm, we expect the time taken to decode $Bb_2$ to be about logm times as long as it would take to copy the block, with a factor of order 1 that depends on the size of the shifts used in the encoding.

In summary, encoding with both schemes is close to optimal, decoding in the XOR case takes about logm times as long as it takes to access the necessary N components from memory, and the arithmetic case decoding takes about logn times the access time. Since decoding time is expected to be dominated by network and disk access times, the practical difference between the two schemes is small.

Compared to the best implementations of Generalized Reed-Solomon codes for RAID applications (see the Feng et al. paper cited in the Background section, and Part II published in the same journal in December of 2005), our performance in terms of number of XOR's needed for encoding and decoding, and the parallelizability of the XOR's, is about on a par, with about a factor of two advantage for encoding for creating more than 4 extra components. When the number of components makes it impractical to precompute the formulas needed to recover from all possible erasure cases, the needed formulas must be derived on demand. Assuming the blocks are large, the time taken for deriving the formulas will be small compared to the time needed for the actual decoding, up to some size. If the block that was encoded is of size B then the number of operations needed for recovering M lost components in an N+M code, given the formulas, is of order MB. If the formulas are determined by Gaussian elimination (as in FIG. 16), the number of operations needed to derive them is of order $M^3$. Thus as long as B is much larger than $M^2$, the time needed to determine the formulas will be a small part of the decoding time. If the structure of the coefficient matrix allows the formulas to be derived in less than $M^3$ operations, then the situation is better than this.

OTHER EMBODIMENTS

Many other implementations other than those described above are within the invention, which is defined by the following claims, and other claims to which the applicant may be entitled. As mentioned earlier, it is not possible to describe here all possible implementations of the invention, but a few possibilities are discussed in the following paragraphs. Not all of the features described above and appearing in some of the claims below are necessary to practicing the invention. Only the features recited in a particular claim are required for practicing the invention described in that claim. Features have been intentionally left out of claims in order to describe the invention at a breadth consistent with the inventors' contribution.

The storage assignment (routing) table (e.g., FIG. 10) can be implemented in many different ways; it need not be a table in the strict sense, as long a sit specifies the relationships between address range, redundant component, and data store.

A mechanism has been described to construct a routing table that divides up a block-identifier address space among a set of storage elements in order to provide efficient access, allow storage to be added or removed, and to allow recovery after a failure. Some specific encoding schemes for redundant components representing stored blocks of data were also discussed.

Many details were presented in order to clarify the operation of the disclosed implementation and are inesssential (e.g., specific data structures and formats). Some properties that were included (e.g., pseudorandom assignment of roles to stores, variable size of table, etc.) are optimizations and could be omitted or handled differently. In this section we discuss some alternative embodiments.

Routing Table

Although we have presented a specific search algorithm which incorporates a number of measures of table quality and prioritizes them in a particular manner, many other algorithms could have been used instead. Other heuristic search algorithms could be used to consider explicit or implicit versions of the same quality metrics and fill in the routing tables. Other data structures could be used to record equivalent information, and the NewTable and OldTable described could be combined into one structure or split into multiple structures. The structure or structures could have some maximum size, and could even start off at this maximum size, rather than growing incrementally. It might be the case that not all structures that comprise the table are recomputed each time the table is regenerated.

Perhaps the greatest advantage of a table-based approach is that metrics can be added or modified, and the order of importance of different metrics can be adjusted, in order to generate a routing table that incorporates desired properties. Once the table is generated, the time needed to access data using the assignments recorded in the table is independent of how hard it was to optimize the set of properties that have been incorporated in it.

Measures of routing table quality are related mainly to:
(1) Number of hardware failures tolerated
(2) Total available capacity achieved
(3) Speed of authority transfers These measures are mostly dealt with in the disclosed implementation implicitly rather than explicitly: properties are imposed on the routing table that are designed to improve a metric, without trying to compute the actual vale of the metric. For example, minimizing unnecessary reshuffling of data is expected to improve recovery speed. In practice, the determinants of system performance are complex and changes to the order in which metrics are prioritized, and which metrics are used, need to be tested in order to achieve desired results. In the disclosed implementation, these three kinds of measures are prioritized in the design in the order given. Some related measures are discussed below.

(1) Number of hardware failures tolerated. As far as routing table generation is concerned, this metric is reflected in the number of redundant components for each address range, and in the pairing constraints that are strictly enforced. It was previously noted that pairing constraints might be changed as a function of system size: for example, they might be relaxed if the system gets too small, in order to allow as much recovery as remains possible. Additional constraints on the placement of redundant data could also be added, to account for expected correlations in component failures (e.g., subsystems that share some resource, are physically close together, etc.).

Although the disclosed implementation uses a fixed number of redundant components for all blocks, the same routing table would serve if the number of redundant components were different for different kinds of data. For example, small blocks might be replicated M+1 times, while large blocks are split into N pieces and encoded into M extra components. In both cases, the system could recover from the loss of M components. The routing table might simply be constructed with the maximum number of entries per column (N+M in the example), with not all entries used for all blocks. As another example, more critical data could be protected from a larger number of hardware failures than less critical data by using two different values of M, with the routing table constructed to handle the larger value.

In a clique with S servers where M redundant components can be lost and recovered, as long as ⌈R/S⌉≦M, it is useful to impose the pairing constraint that a single server can't be assigned more than ⌈/⌉ times to the same address range. This also allows a storage system with a large value of R to be scaled down to a relatively small number of servers. The implementation cost of allowing the flexibility is essentially just the ability to impose this constraint in the routing table. The constraint can also be imposed that, as long as ⌈R/D⌉≦M, no more than ⌈/D⌉ redundant components can be assigned to the same store. If ⌈R/D⌉≦M, no more than ⌈R/D⌉ redundant components can be assigned to the same store. If ⌈R/S⌉>M, then the first constraint should be dropped.

Figure 17:
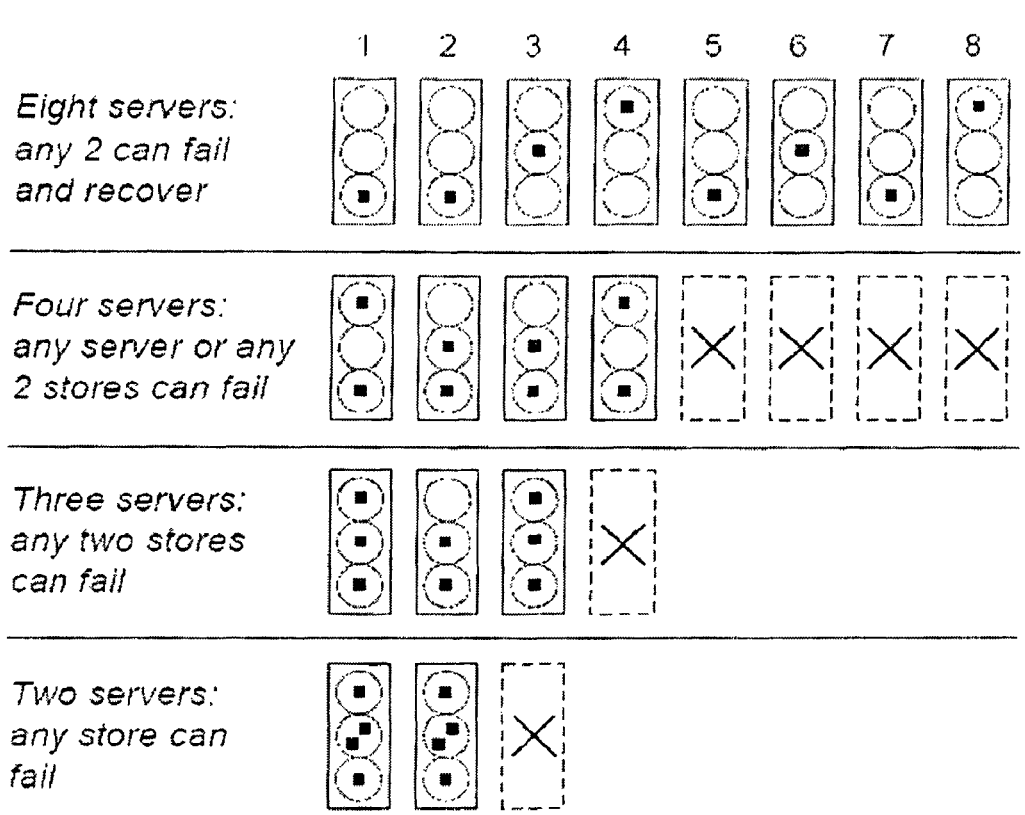
FIG. 17 illustrates the time history of the placement of eight redundant components of 6+2 erasure code (black squares) as servers fail.

An example is shown in FIG. 17. Each store is represented by a circle and each server by a rectangle. The eight redundant components of a block B are shown by eight black squares, located on stores within servers. In this example, we are using an N+M=6+2 code, so any two of the eight redundant components can be lost and recovered: the overhead for this capability is 33% extra storage. As long as there are at least eight servers in the clique, it can withstand the loss of any two. If there are only four servers in the clique, then each must hold two components of each block. The clique is still safe from any single server failure. As long as there are at least a total of eight stores in the clique, the clique remains safe from any two simultaneous failures of stores. The clique keeps the data as safe as it can with the remaining storage. If another server fails and there are now only six stores left, then the clique allows up to two components of the same block on the same store, and can still withstand a single store failure.

(2) Total available capacity achieved. Given a table-based scheme, quantization of address range sizes request a minimum table size that is determined by a specified tolerance for wasted space. This is true even if all address ranges are not the same size.

Total available capacity is given highest priority in the disclosed implementation after failure tolerance. In a system with a hierarchy of correlated failure possibilities, it might be desirable that total available capacity be given a higher priority than some of the less likely failure groupings. This would mean, in terms of the disclosed implementation of the algorithm, that some pairing constraints would be enforced strictly (in the choice of candidate Columns), while other pairing constraints are just used as preferences (in the selection of TheColumn out of Columns) when other higher priority measures of table quality are equally well served by a number of choices.

(3) Speed of authority transfers. This metric is reflected implicitly in the disclosed implementation by minimizing the over-pairing metric, which serves both to avoid placing an unfair load in sourcing data for recovery on any server, and also to avoid the need for extra data transfers by minimizing the effect of disallowed-pairs constraints, Given a choice during table generation, favoring changing entries that have already changed if this improves the table (in order to make only the best changes), rather than changing new entries, also serves to reduce the number of entries that have changed, and hence the amount of data that needs to be reshuffled.

The algorithm currently does not take into account the fact that some storage subsystems may provide higher bandwidth access to their storage, or may have faster network connections. These kinds of factors could be used to weight comparisons, in order to decide which over-pairing is worse. Alternatively, an extra preference could be included in the algorithm based on hardware factors, and used to break ties. In systems with a few stores that are larger than the rest, these will limit authority transfer performance and it may be that over-pairing should not be considered for the rest, or at least given less weight.

In the form of the algorithm described in the disclosed implementation, some of the choices which might be varied and still achieve good over-pairing metrics include: change the order of the preferences governing the selection of Replacement, change the order of the preferences governing the selection of TheColumn, remove some of the preferences considered, or change the way in which the pairing constraint is computed. The last of these might involve, for example, considering the most-improving case before the least-worsening case, or computing the pairing constraint by alternating the two cases, considering only the best pair or least-worst pair at each step, and then eliminating them from consideration at the next step until a single best TheColum has been found, or all pairs have been considered. Higher order evenness metrics could also be applied to the distribution of combinations that appear in the routing table, rather than just considering pairing.

Pairing constraints might also be imposed in order to simplify the implementation of the authority transfer process. For example, for R=2 it might be desired that no source store (listed in OldTable) has to send any redundant component to more than one place. This would mean that NewTable couldn't contain moire than one difference from OldTable in any column. This constraint can always be met without reducing the total available capacity of the clique as long as, in the disclosed implementation of the algorithm. Replacement is most preferentially selected to be the biggest store of the biggest server, and the table has not reached its maximum size. (It may be necessary in some cases where the clique contains stores of enormously different capacities to widen the table and rerun the algorithm).

Erasure Coding

The encodings discussed for the disclosed implementation are provided for illustrative purposes only; any erasure resilient code (including simple replication) is compatible with the routing table mechanism described. This includes codes in which none of the redundant components are the original fragments into which a block was divided before encoding. The routing table algorithm described can also be used for tables for systems (or levels of hierarchy of systems) with no redundancy at all: in this case, the pairing constraints and pairing preferences become irrelevant and are omitted.

Many other encodings that allow the extra redundant components to be larger than the fragments of the original block are possible. Although the examples given use linear equations with power of two coefficients, linear equations with other coefficients may have advantages in some cases, for both the arithmetic and XOR encodings. For example, using only power of two coefficients and the kinds of codes discussed, the average size of the extra redundant components increases linearly with the number of fragments of the original block. Using other coefficients the increase may be slower.

A canonical scheme is presented for constructing linear equations with power of two coefficients, but for special cases there may be more efficient encodings. For example, the 3+3 code in FIG. 15 uses one less shift for encoding than the 3+3 code given by the canonical scheme. In general, matrices in which every 2×2 submatrix has full rank are good candidates for generating erasure codes.

The encodings described in the disclosed implementation have applications to other kinds of storage systems, and to other kinds of data protection. For example, these codes are about as efficient as the best schemes that have been proposed for use in advanced RAID, but these codes are much simpler to implement, test and optimize. In RAID systems sector sizes are normally fixed, which introduces the question of where to keep the extra bits generated by these codes. Ideally the physical sector size would just be increased slightly, or a few spare bits per sector exposed to the RAID controller. It would of course be easier, in practice, to have the RAID controller find a place for the extra bits. One possibility would be to increase the logical sector size used by the RAID controller. For example, if one 512 byte physical-sector was reserved per 64 KB logical-sector, the overhead would be less than 1%. If a smaller logical-sector size than this is preferred, the RAID controller might simply share one 512 byte physical-sector between several adjacent logical-sectors.

The mechanism used in the disclosed implementation for avoiding extra temporary storage of redundant components during failure recovery was described as involving the newly authoritative store receiving one missing component of each block for an address range and then, for each missing component in turn, requesting the other components. An extension of this idea would be to request and process larger groups of missing components simultaneously, so that the sources from which components are being requested have a number of outstanding requests at the same time, allowing them to access their disks more efficiently.

Extra temporary storage can also be avoided in the case where the sources of the redundant components send them at their convenience, rather than at the request of the destination store. In this case, the destination recreates the blocks incrementally as pieces become available. This can be done with most erasure codes. For example, if one store is trying to recreate a redundant component A which can be obtained from the remaining components by the equation $3A=2W+X-4B-D$ (as was the case in one of our examples), then the components on the right hand side of this equation can be supplied one at a time in any order and the sum accumulated. At each stage, the total so far (and a record of which pieces have already been received) are all that need to be stored for A. Once the total is complete, A is derived from it. This technique works equally well for cases where the addition operation is XOR.

Appendix A: Width of Routing Table

The routing table is required to be large enough to represent all stores with enough resolution so that no more than a fraction T of the total available capacity $A_{tot}$ is wasted. This is the tolerance constraint.

Each entry in the routing table is associated with an address range of a fixed width. If a store with available capacity $\alpha_i$ is associated with $e_i$ entries, then each address range represents an available capacity of $\alpha_i/e_i$. If this ratio were constant for all stores, then we would have $A_{tot}=\alpha_i E_{tot}/e_i$, where $E_{tot}$ is the total number of entries in the table. The number of address ranges in the table (the table width) is $W=E_{tot}/R$, where R is the number of redundant components stored for every address range.

In practice, each store must be assigned an integer number of address ranges $e^*_i$ rather than the ideal (non-integer) number $e_i=\alpha_i E_{tot}/A_{tot}$. Whichever store gets assigned the most entries per unit of available capacity will fill first, assuming filling rate is strictly proportional to the number of table entries. This store will be the one that limits the capacity of the clique. We would like to guarantee that $$e^*_i \leq e_i(1+T) \forall i$$

so that the actual available capacity $$A^*_{tot} = \min_i \left(\frac{a_i E_{tot}}{e^*_i}\right) \geq \left(\frac{a_i E_{tot}}{e_i(1+T)}\right) > A_{tot}(1-T). \quad \text{[Equation A0]}$$

We can show that an integer assignment of $e^*_i$'s that meets this constraint exists as long as the number of entries in the table $$E_{tot} \geq D/T, \quad \text{[Equation A1]}$$

where D is the total number of data stores in the clique.

Proof that D/T Entries is Enough:

We choose $E_{tot} \geq D/T$ to be an integer. Then we have a fixed number of entries that need to be divided up among the various $e^*_i$'s. If $\lceil e_i \rceil$ is within tolerance $e_i T$ of $e_i$, then we can choose $e^*_i$ to be this higher integer, and we are left with fewer entries to apportion among the rest of the stores, making it easier to avoid giving too many entries to some store. The question is whether the stores where we have to round down can always be compensated for by adding entries elsewhere without exceeding our tolerance.

Let $\alpha$ be the set of stores where we have to round down:

$$\lceil e_i \rceil - e_i > e_i T \, \forall i \text{ in } \alpha. \quad \text{[Equation A2]}$$

We must choose $e^*_i = \lfloor e_i \rfloor$ for all stores in the set $\alpha$. Not all of the stores can be in the set $\alpha$, since the average number of entries per store is at least $1/T$ (from Equation A1), and a store can't be in a set $\alpha$ if $e_i T \geq 1$. Let $\beta$ be the set consisting of the rest of the stores. The difference between the ideal number of entries and the actual number of entries assigned to stores in the set $\alpha$ is $$\Delta E_\alpha = \sum_\alpha (e_i - \lfloor e_i \rfloor) < \sum_\alpha (1 - e_i T),$$

where the last inequality comes from Equation A2 (and $\lfloor e_i \rfloor \geq \lceil e^i \rceil - 1$). This many extra entries must be assigned to the $\beta$ stores. The maximum number of extra entries that can be assigned to the $\beta$ stores without causing any store to exceed its tolerance is $$\Delta E_\beta = \sum_\beta \lfloor e_i + e_i T \rfloor - e_i > \sum_\beta (e_i T - 1),$$

where the last inequality comes from the fact that $\lfloor x \rfloor > x - 1$ for any x. Therefore $$\Delta E_\beta - \Delta E_\alpha > \sum_i (e_i T - 1) = E_{tot} T - D \geq 0$$

from our choice of $E_{tot} \geq D/T$.

Thus we can always compensate for the stores that must be rounded down by rounding others up without having any store exceed its ideal number of entries by more than the tolerance T. Therefore, from Equation A0. the achievable storage $A^*_{tot}$ is within tolerance T of the ideal $A_{tot}$.

What is claimed is:

1. A method for encoding a block of data to allow it to be stored or transmitted correctly in the face of accidental or deliberate modifications, the method comprising:
   constructing a number n greater than one of original components, each of which is derived from the block and each of which is smaller than the block; and
   combining original components to construct a number m greater than one of new components, the combining comprising:
     scaling original components to determine scaled original components; and
     accumulating scaled original components to determine new components;
   wherein each of the new components is smaller than the sum of the sizes of the original components combined to produce it;
   wherein the block can be reconstructed from any set of n different components selected from the original components and new components;
   wherein the size of a one of the new components is larger than the size of a one of the original components that were combined to construct it;
   wherein the scaling step includes an operation in which a first original component is used to determine a first operand to a multiplication operation of a non-finite commutative ring with identity; and
   wherein the accumulating step includes an operation in which a first scaled original component is used to determine a first operand to an addition operation of the non-finite commutative ring with identity.

2. The method of claim 1 wherein the addition operation has a second operand derived from a second scaled original component.

3. The method of claim 1 wherein the sum of the sizes of each of the original components plus the sum of the sizes of each of the new components is less than one percent greater than $(1+m/n)$ times the size of the block.

4. The method of claim 1 wherein the number of new components that can be constructed from a fixed set of n original components is not predetermined.

5. The method of claim 1 wherein the addition operation is ordinary integer addition.

6. The method of claim 1 wherein the addition operation is bitwise XOR.

7. The method of claim 1 wherein at least n components selected from the original components and new components are needed to reconstruct the block.

8. The method of claim 1 wherein the multiplication operation is ordinary integer multiplication.

9. The method of claim 1 wherein the new and the original components are sequences of data elements of a fixed size, and the size of a component is the number of the fixed size data elements that constitute it.

10. The method of claim 1 wherein each of the original components and new components is preferentially stored on a storage subsystem that is different than that on which any other of the original components and new components is stored.

11. The method of claim 10 wherein the storage subsystem comprises at least one disk drive.

12. The method of claim 1 wherein the first operand to the multiplication operation is an integer that has a binary representation that comprises bits of the first original component, and a second operand to the multiplication operation is a scaling factor.

13. The method of claim 1
   wherein the first operands to the multiplication operation is an integer determined from the first original component and a second operand to the multiplication operation is a scaling factor;
   wherein the addition operation combines the scaled integer with another integer derived from original components; and
   wherein the multiplication operation is the same as integer multiplication whenever one of its two operands is positive and a power of two.

14. The method of claim 12 or 13 wherein the scaling factor is a power of two with an exponent determined by a multiplication modulo a prime number.

15. The method of claim 1 wherein the multiplication operation is a non-cyclic shift operation.

16. The method of claim 15 wherein the non-cyclic shift operation is implemented as a memory addressing operation.

17. The method of claim 15 wherein a shift-amount of the non-cyclic shift operation is determined, at least in part, by a multiplication modulo a prime number.

* * * * *

UNITED STATES PATENT AND TRADEMARK OFFICE
CERTIFICATE OF CORRECTION

Page 1 of 1

| | |
|---|---|
| PATENT NO. | : 7,979,771 B2 |
| APPLICATION NO. | : 11/696654 |
| DATED | : July 12, 2011 |
| INVENTOR(S) | : Norman H. Margolus and Thomas Jaskiewicz |

It is certified that error appears in the above-identified patent and that said Letters Patent is hereby corrected as shown below:

Column 36, line 41, "operands" should be -- operand --.

Signed and Sealed this
Eighth Day of November, 2011

David J. Kappos
*Director of the United States Patent and Trademark Office*